(12) United States Patent
Wahadaniah et al.

(10) Patent No.: US 9,154,788 B2
(45) Date of Patent: Oct. 6, 2015

(54) IMAGE CODING METHOD AND IMAGE DECODING METHOD

(75) Inventors: Viktor Wahadaniah, Singapore (SG); Chong Soon Lim, Singapore (SG); Sue Mon Thet Naing, Singapore (SG); Jin Li, Singapore (SG); Haiwei Sun, Singapore (SG); Takahiro Nishi, Nara (JP); Hisao Sasai, Osaka (JP); Youji Shibahara, Osaka (JP); Kyoko Tanikawa, Osaka (JP); Toshiyasu Sugio, Osaka (JP); Toru Matsunobu, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 417 days.

(21) Appl. No.: 13/817,004

(22) PCT Filed: May 31, 2012

(86) PCT No.: PCT/JP2012/003581
§ 371 (c)(1),
(2), (4) Date: Feb. 14, 2013

(87) PCT Pub. No.: WO2012/164939
PCT Pub. Date: Dec. 6, 2012

(65) Prior Publication Data
US 2013/0142260 A1  Jun. 6, 2013

Related U.S. Application Data

(60) Provisional application No. 61/492,881, filed on Jun. 3, 2011.

(51) Int. Cl.
H04N 7/12 (2006.01)
H04N 19/50 (2014.01)
(Continued)

(52) U.S. Cl.
CPC ....... H04N 19/00569 (2013.01); H04N 19/102 (2014.11); H04N 19/117 (2014.11);
(Continued)

(58) Field of Classification Search
USPC ..................................................... 375/240.21
See application file for complete search history.

(56) References Cited

U.S. PATENT DOCUMENTS 6,184,935 B1 * 2/2001 Iaquinto et al. ............... 348/441
6,765,587 B1 * 7/2004 Zhang et al. .................. 345/606
(Continued)

FOREIGN PATENT DOCUMENTS

JP         6-54200      2/1994
JP       2003-274193    9/2003

OTHER PUBLICATIONS

International Search Report issued Sep. 18, 2012 in corresponding International Application No. PCT/JP2012/003581.
(Continued)

Primary Examiner — Tracy Li
(74) Attorney, Agent, or Firm — Wenderoth, Lind & Ponack, L.L.P.

(57) ABSTRACT

An image coding method includes obtaining image format information, determining a subsampling method for a luminance signal, storing the subsampling method in a memory, obtaining the subsampling method from the memory, performing subsampling on a luminance signal of a surrounding pixel, calculating a parameter of the linear model using (i) the luminance signal that is subsampled and (ii) chrominance of the surrounding pixel, performing subsampling on the luminance signal of the current block to be coded, and calculating prediction chrominance of the current block to be coded using (i) the parameter of the linear model and (ii) the luminance signal that is subsampled.

4 Claims, 28 Drawing Sheets

(51) Int. Cl.

| | | |
|---|---|---|
| *H04N 19/176* | (2014.01) | |
| *H04N 19/102* | (2014.01) | |
| *H04N 19/593* | (2014.01) | |
| *H04N 19/117* | (2014.01) | |
| *H04N 19/136* | (2014.01) | |
| *H04N 19/186* | (2014.01) | |
| *H04N 19/182* | (2014.01) | |
| *H04N 19/59* | (2014.01) | |

(52) U.S. Cl.
CPC ............ *H04N19/136* (2014.11); *H04N 19/176* (2014.11); *H04N 19/182* (2014.11); *H04N 19/186* (2014.11); *H04N 19/59* (2014.11); *H04N 19/593* (2014.11)

(56) References Cited

U.S. PATENT DOCUMENTS

| | | | |
|---|---|---|---|
| 2005/0063586 A1* | 3/2005 | Munsil et al. | 382/162 |
| 2008/0130754 A1* | 6/2008 | Winger | 375/240.21 |
| 2011/0058064 A1* | 3/2011 | Hatano | 348/223.1 |

OTHER PUBLICATIONS

ISO/IEC 14496-10 (MPEG-4 Part10: Advanced Video Coding), Oct. 1, 2004.

Thomas Wiegand et al., "Overview of the H.264/AVC Video Coding Standard", IEEE Transactions on Circuits and Systems for Video Technology, vol. 13, No. 7, Jul. 2003, pp. 560-576.

\* cited by examiner

FIG. 4

| Chrominance format index number | Chrominance format | Horizontal direction ratio | Vertical direction ratio |
|---|---|---|---|
| - | monochrome | - | - |
| 0 | YUV4:1:1 | 4 | 1 |
| 1 | YUV4:2:0 | 2 | 2 |
| 2 | YUV4:2:2 | 2 | 1 |
| 3 | YUV4:4:4 | 1 | 1 |
| 4 | RGB | - | - |

Chrominance format

FIG. 5

| Field type index number | Field type |
|---|---|
| 0 | Frame |
| 1 | Top field |
| 2 | Bottom field |

Recording method

FIG. 6

| Chrominance format \ Field type | 0 Frame | 1 Top field | 2 Bottom field |
|---|---|---|---|
| 0 YUV4:1:1 | Subsampling method 1 | Subsampling method 1 | Subsampling method 1 |
| 1 YUV4:2:0 | Subsampling method 2 | Subsampling method 3 | Subsampling method 4 |
| 2 YUV4:2:2 | Subsampling method 5 | Subsampling method 5 | Subsampling method 5 |
| 3 YUV4:4:4 | No subsampling | No subsampling | No subsampling |
| 4 RGB | No subsampling | No subsampling | No subsampling |

Subsampling method table

○: Chrominance signal
✕: Luminance signal

○: Chrominance signal
✕: Luminance signal

○: Chrominance signal
✕: Luminance signal

○ : Chrominance signal
✗ : Luminance signal

○ : Chrominance signal
✗ : Luminance signal

○: Chrominance signal
✕: Luminance signal

○: Chrominance signal
✕: Luminance signal

FIG. 21

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 32
| Corresponding standard | Driving frequency |
|---|---|
| MPEG-4 AVC | 500 MHz |
| MPEG-2 | 350 MHz |
| ⋮ | ⋮ |
FIG. 33A
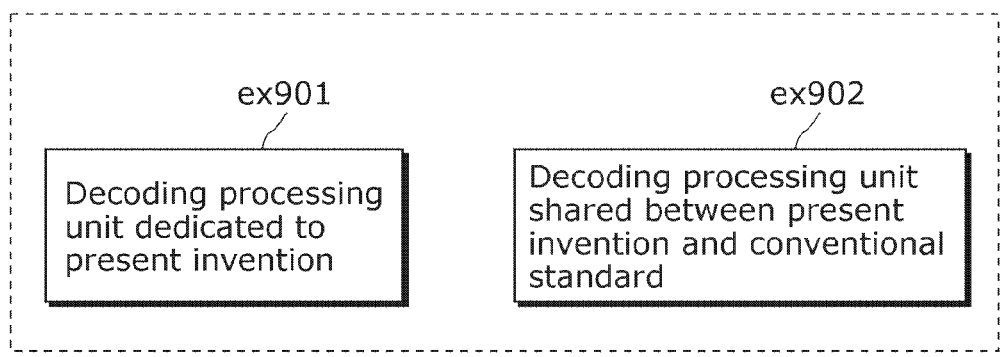
FIG. 33B
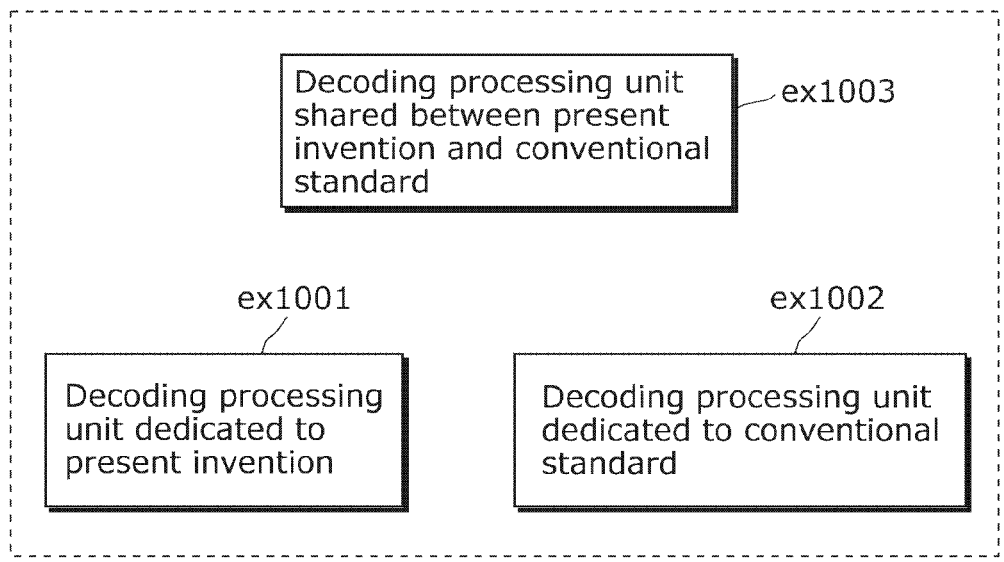

IMAGE CODING METHOD AND IMAGE DECODING METHOD

This application is the National Stage of International Application No. PCT/JP2012/003581, filed May 31, 2012, which claims the benefit of U.S. Provisional Application No. 61/492,881, filed Jun. 3, 2011.

TECHNICAL FIELD

The present invention relates to an image coding method for predicting chrominance according to a linear model, using the luminance of an image.

BACKGROUND ART

Non Patent Literature 1 and Non Patent Literature 2 disclose a technique related to an image coding method for predicting a chrominance signal according to a linear model, using the luminance of an image.

CITATION LIST

Non Patent Literature

[NPL 1]
ISO/IEC 14496-10 "MPEG-4 Part 10 Advanced Video Coding"

[NPL2]
Thomas Wiegand et al, "Overview of the H.264/AVC Video Coding Standard," IEEE TRANSACTIONS ON CIRCUITS AND SYSTEMS FOR VIDEO TECHNOLOGY, JULY 2003, PP. 560-576

SUMMARY OF INVENTION

Technical Problem

However, there are cases where sufficient coding efficiency cannot be obtained from the technique disclosed in Non Patent Literature 1 and Non Patent Literature 2.

Therefore, the present invention has an object to provide an image coding method which can improve coding efficiency.

Solution to Problem

In order to achieve the above mentioned goal, an image coding method according to an aspect of the present invention is an image coding method is an image coding method for predicting chrominance according to a linear model, using luminance of an image, the image coding method comprising: obtaining image format information from an input image; determining a subsampling method for a luminance signal using the image format information; storing the subsampling method in a memory; obtaining the subsampling method from the memory; performing, by the subsampling method, subsampling on a coded luminance signal of a surrounding pixel of a current block to be coded; calculating a parameter of the linear model using (i) the coded luminance signal that is subsampled in the performing of subsampling on the coded luminance signal of the surrounding pixel of the current block and (ii) coded chrominance of the surrounding pixel; performing, by the subsampling method, subsampling on the coded luminance signal of the current block; and calculating prediction chrominance of the current block using (i) the parameter of the linear model and (ii) the coded luminance signal that is subsampled in the performing of subsampling on the coded luminance signal of the current block.

It should be noted that the general or specific aspects may be implemented using an apparatus, a system, an integrated circuit, a computer program, or a non-transitory recording medium such as a computer-readable recording medium such as a CD-ROM, or any combination of systems, methods, integrated circuits, computer programs, or computer-readable recording media.

Advantageous Effects of Invention

The present invention makes it possible to improve coding efficiency for the current images to be coded of various types.

BRIEF DESCRIPTION OF DRAWINGS

FIG. 4 is a table showing an example of chrominance format according to Embodiment 1.

FIG. 5 is a table showing an example of an image recording method according to Embodiment 1.

FIG. 6 is a matrix diagram showing an example of a subsampling method table according to Embodiment 1.

FIG. 21 is an illustration showing a structure of multiplexed data.

FIG. 32 is an illustration showing an example of a look-up table in which standards of video data are associated with the driving frequencies.

FIG. 33A is an illustration showing an example of a configuration for sharing a module of a signal processing unit.

FIG. 33B is an illustration showing another example of a configuration for sharing a module of a signal processing unit.

DESCRIPTION OF EMBODIMENTS (Underlying Knowledge Forming Basis of the Present Invention)

In recent years, there have been an increasing number of applications for video-on-demand type services, for example, including video conferences, digital video broadcasting, and streaming of video content via the Internet, and these applications depend on transmission of video information. At the time of transmission or recording of video data, a considerable amount of data is transmitted through a conventional transmission path of a limited bandwidth or is stored in a conventional recording medium with limited data capacity. In order to transmit video information through a conventional transmission channel and store video information in a conventional recording medium, it is essential to compress or reduce the amount of digital data.

Thus, a plurality of video coding standards have been developed for compressing video data. Such video coding standards include, for example, the ITU-T standards denoted as H. 26x, produced by the Telecommunication Standardization Sector of the International Telecommunication Union, and the ISO/IEC standards denoted as MPEG-x. The most up-to-date and advanced video coding standard is currently the standard denoted as H.264/AVC or MPEG-4 AVC (see Non Patent Literature 1 and Non Patent Literature 2).

Figure 1:
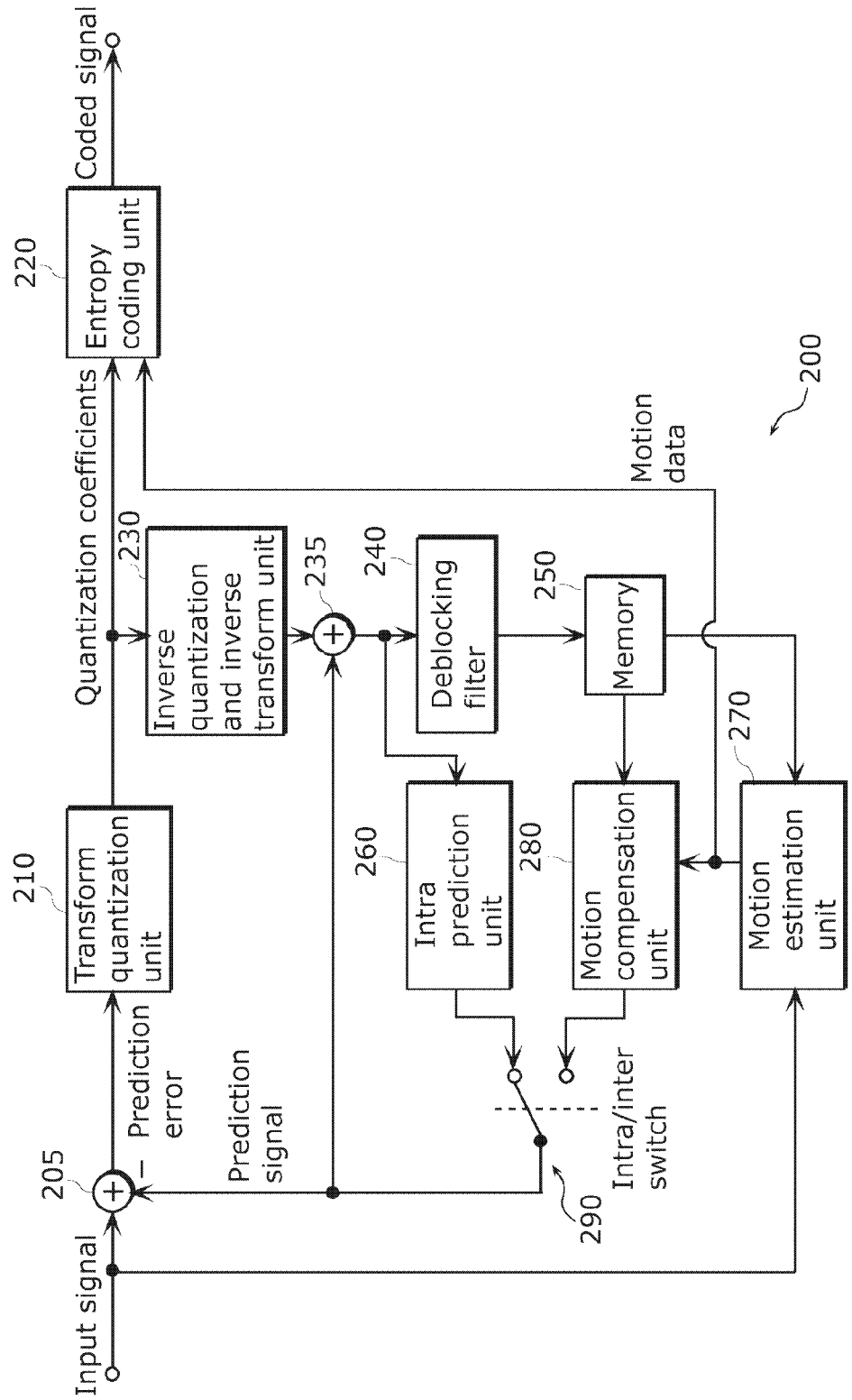
FIG. 1 is a block diagram showing an example of a configuration of an image coding apparatus according to Embodiment 1.
Figure 12:
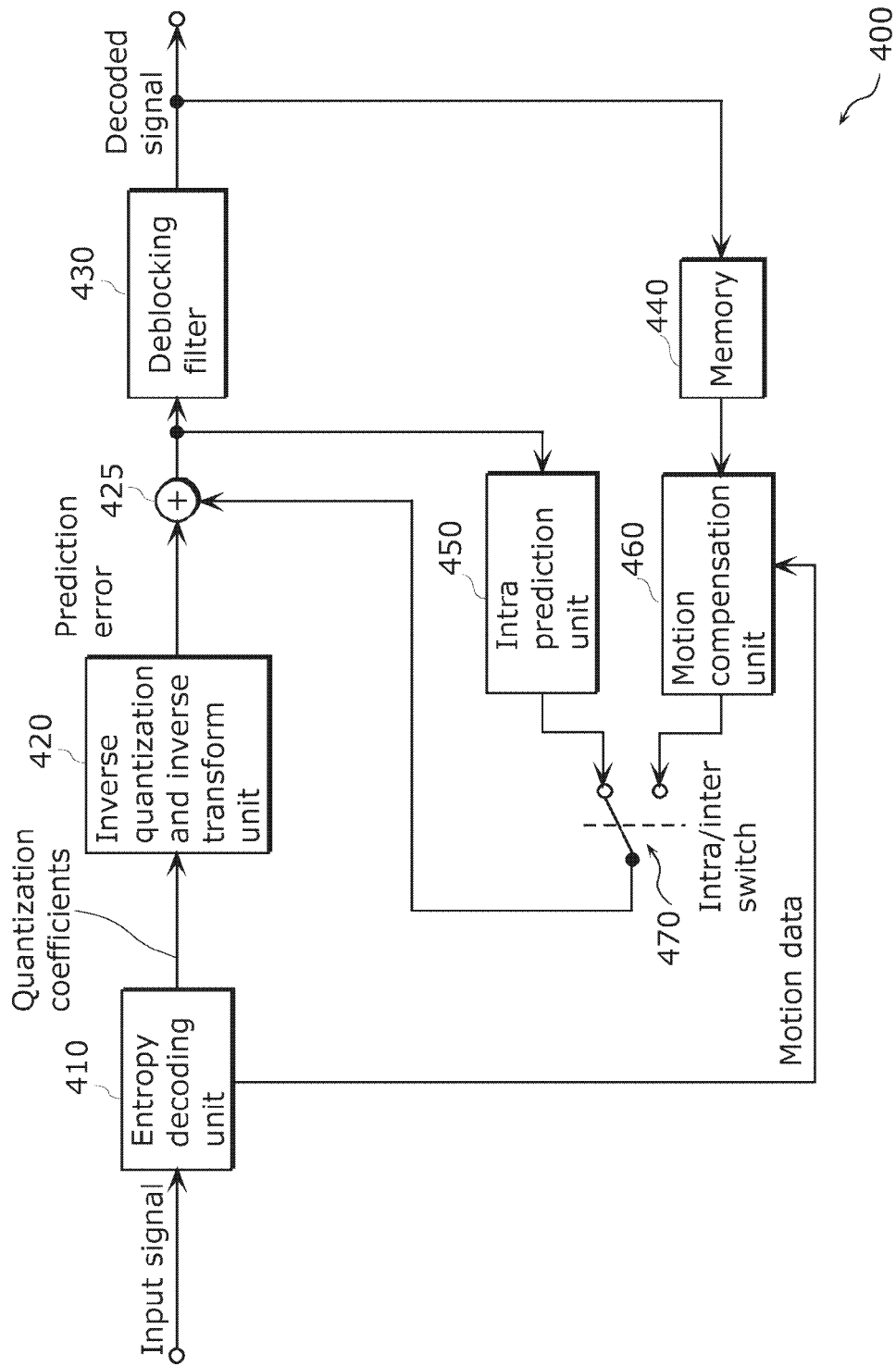
FIG. 12 is a block diagram showing an example of a configuration of an image decoding apparatus according to Embodiment 2.

In the H.264/AVC standard, as shown in FIGS. 1 and 12, the coding process roughly includes prediction, transform, quantization, and entropy coding. Among these, prediction is further divided into inter prediction and intra prediction. In intra prediction, a prediction pixel is generated by interpolating from an adjacent pixel of macroblock which is adjacent above or left to the current macroblock to be processed, and the difference from the prediction pixel is coded. In intra prediction of H.264/AVC, prediction is performed not on a DCT coefficient level but on a pixel level, and pixel prediction patterns in vertical, horizontal, and diagonal directions are also used.

However, since the above described technique uses upper or left adjacent macroblock, it is difficult to predict the shape and intensity of an edge with high accuracy and therefore it is not possible for sufficient coding efficiency to be obtained.

Therefore, the image coding method and the image decoding method which can improve coding efficiency are beneficial.

Therefore, an image coding method according to an aspect of the present invention is an image coding method is an image coding method for predicting chrominance according to a linear model, using luminance of an image, the image coding method comprising: obtaining image format information from an input image; determining a subsampling method for a luminance signal using the image format information; storing the subsampling method in a memory; obtaining the subsampling method from the memory; performing, by the subsampling method, subsampling on a coded luminance signal of a surrounding pixel of a current block to be coded; calculating a parameter of the linear model using (i) the coded luminance signal that is subsampled in the performing of subsampling on the coded luminance signal of the surrounding pixel of the current block and (ii) coded chrominance of the surrounding pixel; performing, by the subsampling method, subsampling on the coded luminance signal of the current block; and calculating prediction chrominance of the current block using (i) the parameter of the linear model and (ii) the coded luminance signal that is subsampled in the performing of subsampling on the coded luminance signal of the current block.

For example, in the determining, the subsampling method may be determined with reference to a subsampling method table in which the image format information and the subsampling method are associated with each other.

Moreover, an image decoding method according to an aspect of the present invention may be an image decoding method for predicting chrominance according to a linear model, using a bitstream, the image decoding method comprising: obtaining image format information from an input bitstream; determining a subsampling method for a luminance signal using the image format information; storing the subsampling method in a memory; obtaining the subsampling method from the memory; performing, by the subsampling method, subsampling on a decoded luminance signal of a surrounding pixel of a current block to be decoded; calculating a parameter of the linear model using (i) the decoded luminance signal that is subsampled in the performing of subsampling on the decoded luminance signal of the surrounding pixel of the current block and (ii) decoded chrominance of the surrounding pixel; performing, by the subsampling method, subsampling on a decoded luminance signal of the current block; and calculating prediction chrominance of the current block using (i) the parameter of the linear model and (ii) the decoded luminance signal that is subsampled in the performing of subsampling on the decoded luminance signal of the current block.

For example, in the determining, the subsampling method may be determined with reference to a subsampling method table in which the image format information and the subsampling method are associated with each other.

For example, the image coding method according to an aspect of the present invention is an image coding method for performing compression coding on image data, and may predict chrominance signal of the current block to be coded using coded luminance signal of the current block to be coded. In prediction, linear function of luminance signal and chrominance signal is used. The number of samples for luminance signal and the number of samples for chrominance signal, and the sample positions of luminance signal and chrominance signal are matched depending on the type of the current image to be coded. The method for matching the number of samples and the sample positions is performed by subsampling luminance signal.

With this, for example, by using two constant values α and β like Expression 1, the linear function which relates luminance signal and chrominance signal can be realized.

[Math. 1]

$$Pred_c[y,x] = \alpha \cdot Rec'_L[x,y] + \beta \quad \text{(Expression 1)}$$

Here, $Rec'_L$ denotes the coded luminance signal of the current block to be coded on which subsampling is performed, and $Pred_c$ denotes the prediction chrominance signal of the current block to be coded.

With this, by using the coded luminance signal of the same block, it is possible to predict chrominance signal with higher accuracy. Moreover, by performing subsampling on the coded luminance signal, the chrominance signals can be predicted for various types of the current images to be coded.

It should be noted that these general or specific aspects may be implemented using an apparatus, a system, an integrated circuit, a computer program, or a non-transitory recording medium such as a computer-readable recording medium such as a CD-ROM, or any combination of systems, methods, integrated circuits, computer programs, or computer-readable recording media.

The following will describe an image coding method and an image decoding method according to an aspect of the present invention in detail with reference to the drawings.

It should be noted that each of the embodiments described below shows a general or specific example of the present invention. The numerical values, shapes, materials, structural elements, the arrangement and connection of the structural elements, steps, the processing order of the steps etc. shown in the following embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

FIG. 1 is a block diagram showing a configuration of an image coding apparatus according to the present embodiment. The image coding apparatus 200 shown in FIG. 1 includes a subtractor 205, a transform quantization unit 210, an entropy coding unit 220, an inverse quantization and inverse transform unit 230, an adder 235, a deblocking filter 240, a memory 250, an intra prediction unit 260, a motion estimation unit 270, a motion compensation unit 280, and an intra/inter switch 290.

A chrominance signal intra prediction unit to be described later is typically included in the intra prediction unit 260, but may be included in other constituent elements. Moreover, the chrominance signal intra prediction unit may be included in an image coding apparatus different from the image coding apparatus 200 shown in FIG. 1.

Figure 2:
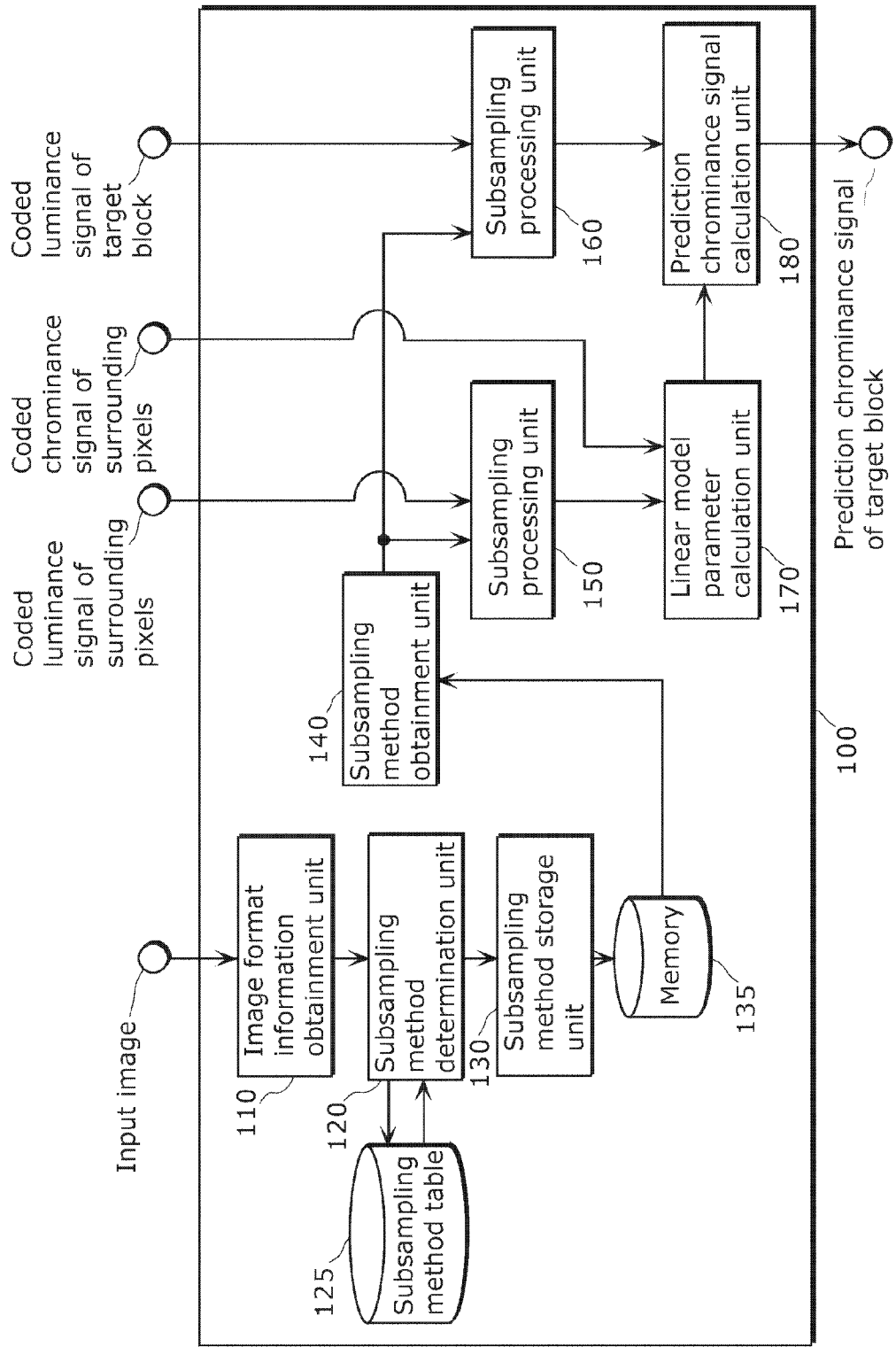
FIG. 2 is a block diagram showing an example of chrominance signal intra prediction according to Embodiment 1.

The configuration of the chrominance signal intra prediction unit which performs an intra prediction method in the coding of chrominance signal according to the present embodiment will be described. FIG. 2 is a block diagram showing an example of a chrominance signal intra prediction unit according to Embodiment 1. It should be noted that the chrominance signal intra prediction unit 100 according to Embodiment 1 corresponds to part of the image coding apparatus which performs compression coding on image signal and outputs coded image data.

As shown in FIG. 2, the chrominance signal intra prediction unit 100 includes an image format information obtainment unit 110, a subsampling method table 125, a subsampling method determination unit 120, a subsampling method storage unit 130, a memory 135, a subsampling method obtainment unit 140, a subsampling processing unit 150, a subsampling processing unit 160, a linear model parameter calculation unit 170, and a prediction chrominance signal calculation unit 180.

An operation of the chrominance signal intra prediction unit 100 according to Embodiment 1 will be described with reference to FIG. 3.

Figure 3:
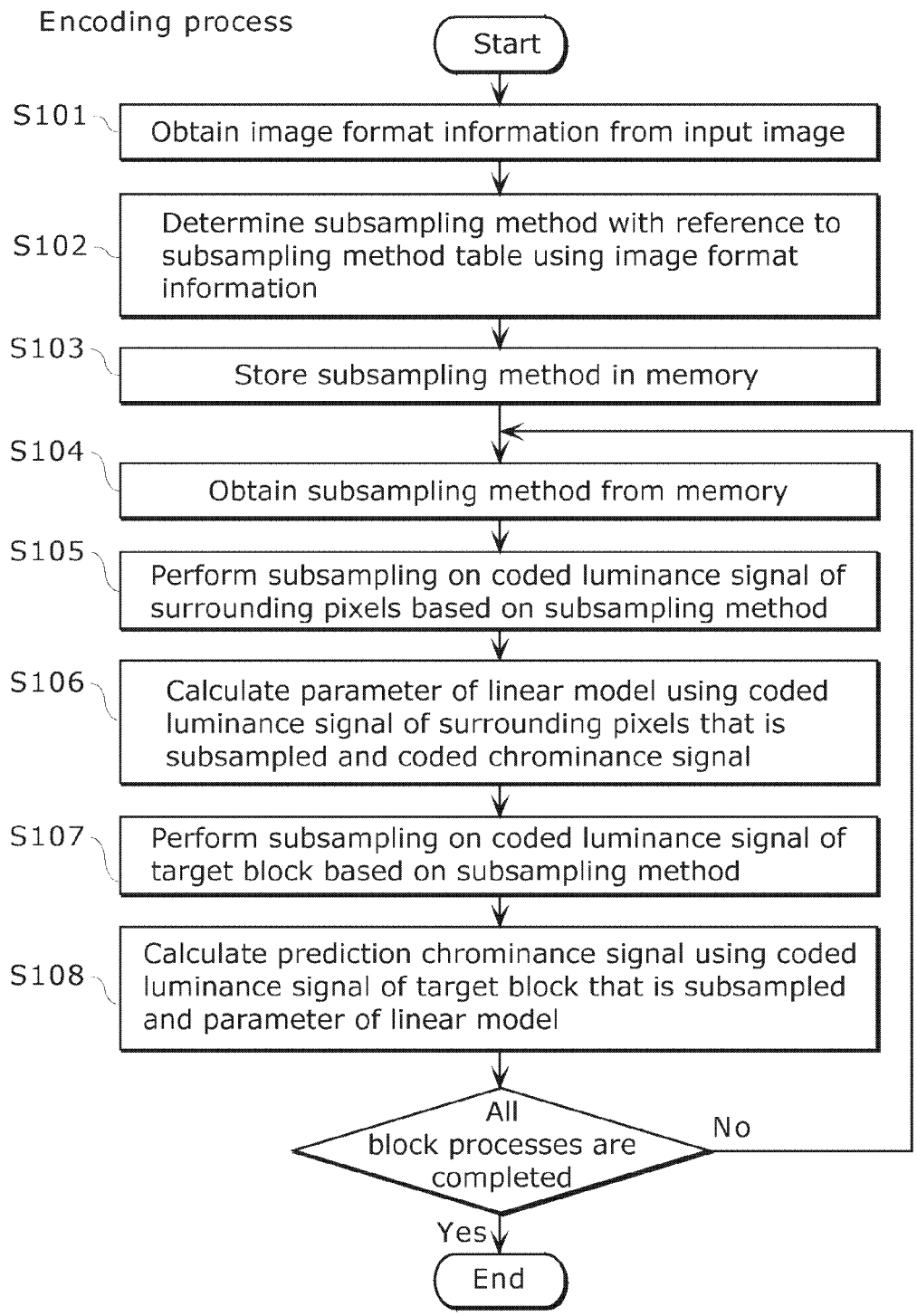
FIG. 3 is a flowchart showing an example of chrominance signal intra prediction according to Embodiment 1.

FIG. 3 is a flowchart showing a flow of processes performed by the chrominance signal intra prediction unit 100. First, image format information of an input image that is a coding target is obtained (Step S101). The image format information includes chrominance format information showing the ratio of the number of samples and the sample positions for chrominance signal with respect to the ratio of the number of samples and the sample positions for luminance signal, and field type information showing whether the recording method of input image belongs to a progressive method or an interlace method. The image format information is obtained by a method for reading image format information recorded in the header part of an image.

Next, by using the obtained image format information, with reference to the subsampling method table 125, a subsampling method to be applied to luminance signal is determined (Step S102). The subsampling method table 125 stores subsampling methods. The subsampling method table 125 is formed in matrix of combination of chrominance format information and field type information, and a subsampling method is allocated to each of the combinations.

Next, the determined subsampling method is stored in the memory 135 (Step S103). The once stored subsampling method is held until an input image is switched.

The following processes are iterative processes performed in all the blocks to be processed of the input image. It should be noted that the above described S101 to S103 and the following Steps S104 to S108 are not necessarily continuous. Steps S101 to S103 may be performed at previous stages instead of the beginning of chrominance signal intra prediction, and the subsampling method may be shared by a processing unit other than the chrominance signal intra prediction.

In the iterative process, first, the subsampling method stored in the memory 135 is obtained (Step S104).

Next, based on the obtained sampling method, by performing subsampling on the coded luminance signals of surrounding pixels of the current block to be coded, the number of samples and the sample positions for the luminance signals are matched with respect to the number of samples and the sample positions for coded chrominance signal of the surrounding pixels (Step S105).

Next, by using the coded luminance signal and the coded chrominance signal both on which subsampling is performed, parameters of linear model are extracted (Step S106). More specifically, the parameters are calculated by least squares of parameter values α and β of linear model of Expression 1. At this time, as measured value, by using the coding luminance signal and the coded chrominance signal both on which subsampling is performed, α and β are calculated by Expression 2 and Expression 3.

[Math. 2]

$$\alpha = \frac{\sum Rec_c(i) \cdot Rec'_L(i) - \sum Rec_c(i) \cdot \sum Rec'_L(i)}{\sum Rec'_L(i) \cdot Rec'_L(i) - (\sum Rec'_L(i))^2}$$ (Expression 2)

[Math. 3]

$$\beta = \sum Rec_c(i) - \alpha \cdot \sum Rec'_L(i)$$ (Expression 3)

Next, based on the obtained subsampling method, by performing subsampling on the coded luminance signal of the current block to be coded, the number of samples and the sample positions for the coded luminance signal of the current block to be coded are matched with respect to the number of samples and the samples positions for the chrominance signal of the current block to be coded (Step S107).

Next, by substituting, into Expression 1, the prediction parameters α and β, and coded luminance signal of the current block to be coded on which subsampling is performed, the prediction chrominance signal of the current block to be coded is calculated (Step S108).

Here, the subsampling method table 125 will be described. The chrominance format on which the image coding method performs can define 6 patterns such as FIG. 4 (monochrome, YUV4:1:1, YUV4:2:0, YUV4:2:2, YUV4:4:4, and RGB in FIG. 4) according to the ratio of the number of samples and the sample positions with respect to the number of samples and the sample positions for luminance signal. Among them, index numbers 0 to 4 are allocated to 5 patterns excluding monochrome image on which chrominance process itself is not performed. The field type, as shown in FIG. 5, can be defined as three patterns of progressive, top field, and bottom field (Frame, Top field, and Bottom field in FIG. 5). Index numbers 0 to 2 are also allocated to these.

As shown in FIG. 6, the subsampling method table 125 is a matrix of the chrominance format information and the field type information. Each of the cells stores a subsampling method or an index number each allocated to each of the sampling methods.

By using the chrominance format information and the field type information that are the image format information obtained in Step S101, the corresponding cell can be identified from the subsampling method table 125. In Step S102, a subsampling method or an index number each allocated to each of the sampling methods that are stored in the cell is obtained.

Here, the subsampling method will be described in detail.

Figure 7A:
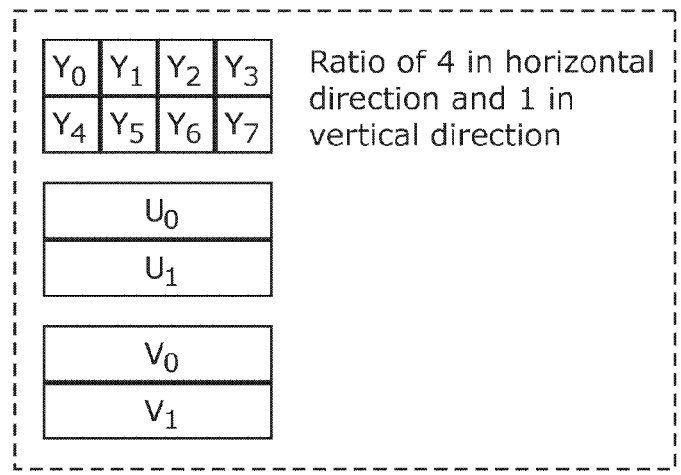
FIG. 7A is a schematic view for describing the ratio of the number of samples for luminance signal and the number of samples for chrominance signal according to Embodiment 1.
Figure 7B:
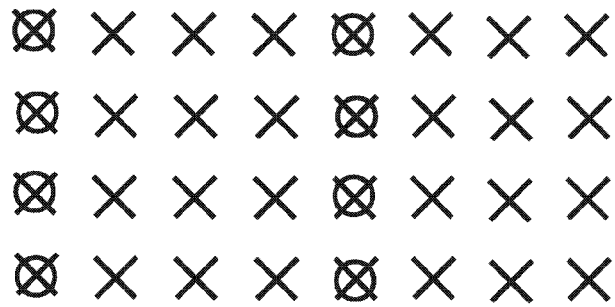
FIG. 7B is a schematic view for describing the sample positions of luminance signal and chrominance signal according to Embodiment 1.

A subsampling method 1, as shown in FIG. 7A, is used when the ratio of the number of samples for luminance signal and the number of samples for chrominance signal is 4 to 1 in a horizontal direction and 1 to 1 in a vertical direction. An example of the sample positions of the luminance signal and the chrominance signal at this time is shown in FIG. 7B. Since there is no dephasing between the positions of the luminance signal and the chrominance signal, subsampling can be simply performed on the luminance signal by performing by decimation process (Expression 4).

[Math. 4]

$$Rec'_L(m,n) = Rec_L(M,N)$$

$$M=4k, N=k (k=0,1,2,\ldots)$$ (Expression 4)

Figure 7C:
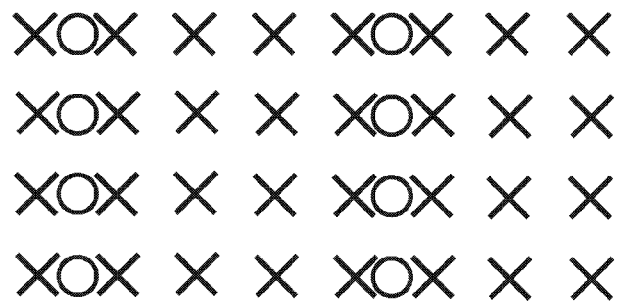
FIG. 7C is a schematic view for describing the sample positions of luminance signal and chrominance signal according to Embodiment 1.

Moreover, an example of where there is dephasing between the sample positions of the luminance signal and the chrominance signal at this time is shown in FIG. 7C. Since there is dephasing in a horizontal direction, the subsampling of luminance signal in which sample positions are matched can be performed by average treatment in a horizontal direction (Expression 5).

[Math. 5]

$$Rec'_L(m, n) = \frac{1}{2}(Rec_L(M, N) + Rec_L(M + 1, N))$$ (Expression 5)

$$M = 4k, N = k (k = 0, 1, 2, \ldots)$$

Figure 8A:
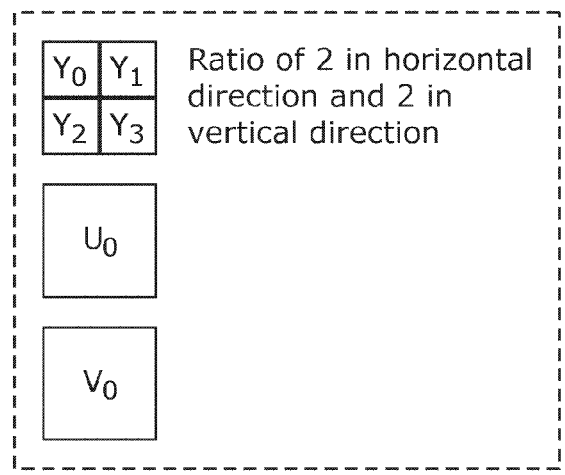
FIG. 8A is a schematic view for describing the ratio of the number of samples for luminance signal and the number of samples for chrominance signal according to Embodiment 1.
Figure 8B:
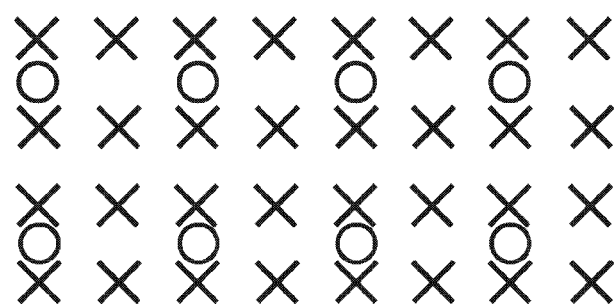
FIG. 8B is a schematic view for describing the sample positions of luminance signal and chrominance signal according to Embodiment 1.

A subsampling method 2, as shown in FIG. 8A, is used when the ratio of the number of samples for luminance signal and the number of samples for chrominance signal is 2 to 1 in a horizontal direction and 2 to 1 in a vertical direction. An example of the sample positions of the luminance signal and the chrominance signal at this time is shown in FIG. 8B. Since the sample position of luminance signal is deviated in a vertical direction from the sample position of chrominance signal, the subsampling of luminance signal in which sample positions are matched can be performed by average treatment in a vertical direction (Expression 6).

[Math. 6]

$$Rec'_L(m, n) = \frac{1}{2}(Rec_L(M, N) + Rec_L(M, N + 1))$$ (Expression 6)

$$M = 2k, N = 2k (k = 0, 1, 2, \ldots)$$

Figure 9A:
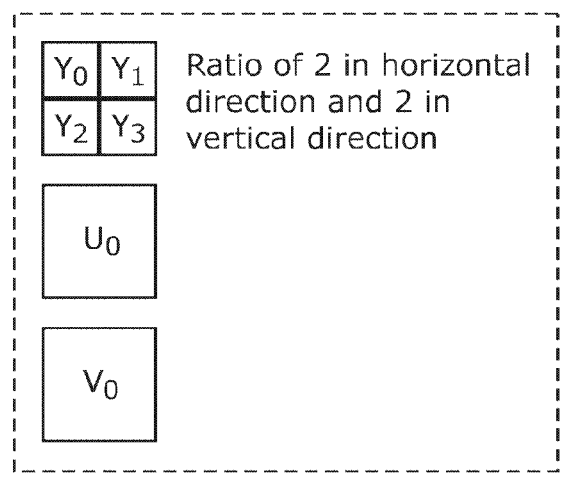
FIG. 9A is a schematic view for describing the ratio of the number of samples for luminance signal and the number of samples for chrominance signal according to Embodiment 1.
Figure 9B:
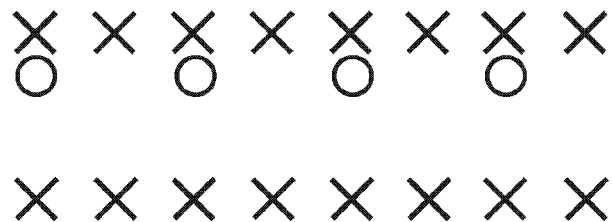
FIG. 9B is a schematic view describing the sample positions of luminance signal and chrominance signal according to Embodiment 1.

A subsampling method 3, as shown in FIG. 9A, is used when the ratio of the number of samples for luminance signal and the number of samples for chrominance signal is 2 to 1 in a horizontal direction and 2 to 1 in a vertical direction. An example of the sample positions of the luminance signal and the chrominance signal at this time is shown in FIG. 9B. The sample position of luminance signal is deviated in a vertical direction from the sample position of chrominance signal. Furthermore, since the field type is top field, there is a difference in distance to chrominance signal between luminance signal located above the chrominance signal and luminance signal located below the chrominance signal. Therefore, the subsampling of luminance signal in which sample positions are matched can be performed by weighted average treatment in a vertical direction (Expression 7).

[Math. 7]

$$Rec'_L(m, n) = \frac{2}{3} Rec_L(M, N) + \frac{1}{3} Rec_L(M, N + 1) \quad \text{(Expression 7)}$$

$$M = 2k, N = 2k(k = 0, 1, 2, \ldots)$$

Figure 10A:
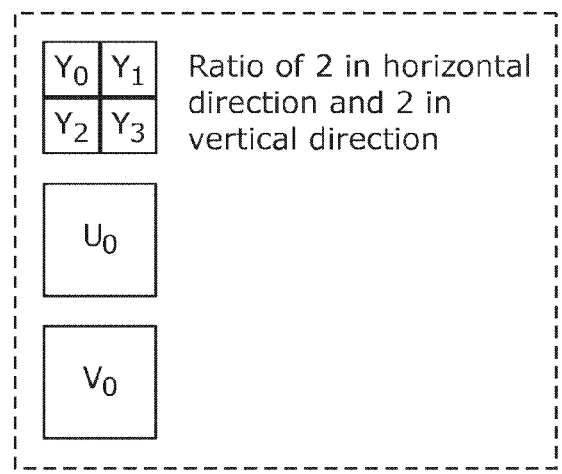
FIG. 10A is a schematic view for describing the ratio of the number of samples for luminance signal and the number of samples for chrominance signal according to Embodiment 1.
Figure 10B:
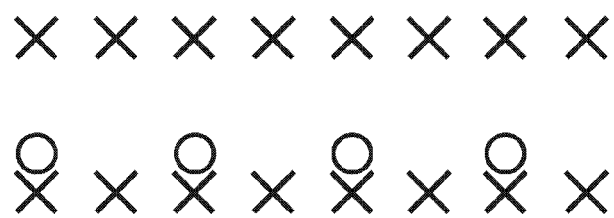
FIG. 10B is a schematic view for describing the sample positions of luminance signal and chrominance signal according to Embodiment 1.

A subsampling method 4, as shown in FIG. 10A, is used when the ratio of the number of samples for luminance signal and the number of samples for chrominance signal is 2 to 1 in a horizontal direction and 2 to 1 in a vertical direction. An example of the sample positions of the luminance signal and the chrominance signal at this time is shown in FIG. 10B. The sample position of luminance signal is deviated in a vertical direction from the sample position of chrominance signal. Furthermore, since the field type is bottom field, there is a difference in distance to chrominance signal between luminance signal located above the chrominance signal and luminance signal located below the chrominance signal. Therefore, as similarly to the subsampling method 3, the subsampling of luminance signal in which sample positions are matched can be performed by weighted average treatment in a vertical direction (Expression 8).

[Math. 8]

$$Rec'_L(m, n) = \frac{1}{3} Rec_L(M, N) + \frac{2}{3} Rec_L(M, N + 1) \quad \text{(Expression 8)}$$

$$M = 2k, N = 2k(k = 0, 1, 2, \ldots)$$

Figure 11A:
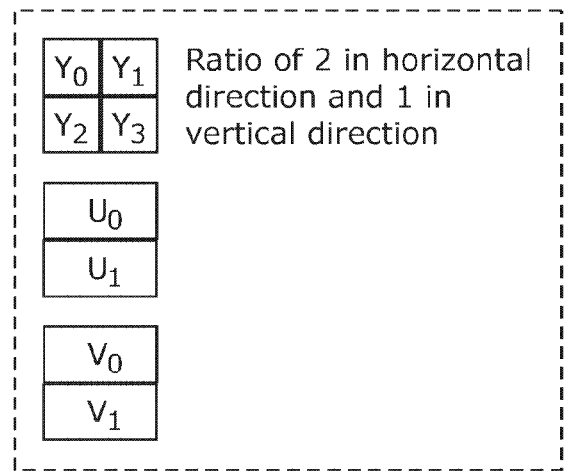
FIG. 11A is a schematic view for describing the ratio of the number of samples for luminance signal and the number of samples for chrominance signal according to Embodiment 1.
Figure 11B:
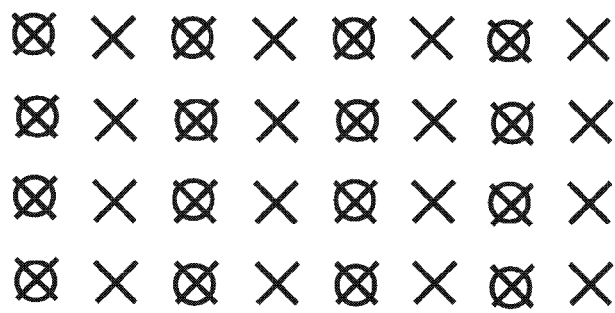
FIG. 11B is a schematic view for describing the sample positions of luminance signal and chrominance signal according to Embodiment 1.

A subsampling method 5, as shown in FIG. 11A, is used when the ratio of the number of samples for luminance signal and the number of samples for chrominance signal is 2 to 1 in a horizontal direction and 1 to 1 in a vertical direction. An example of the sample positions of the luminance signal and the chrominance signal at this time is shown in FIG. 11B. Since there is no dephasing between the sample positions of the luminance signal and the chrominance signal, subsampling can be simply performed on the luminance signal by performing decimation process (Expression 9).

[Math. 9]

$$Rec'_L(m,n) = Rec_L(M,N)$$

$$M=2k, N=k(k=0,1,2,\ldots) \quad \text{(Expression 9)}$$

Figure 11C:
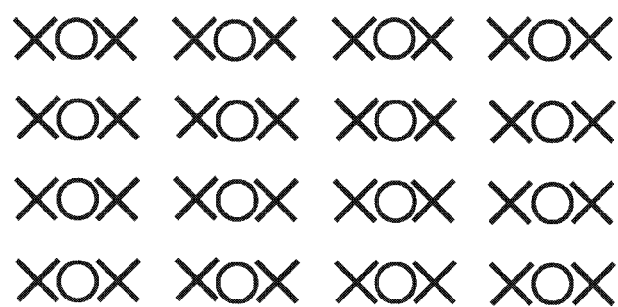
FIG. 11C is a schematic view for describing the sample positions of luminance signal and chrominance signal according to Embodiment 1.

Moreover, an example of where there is dephasing between the sample positions of the luminance signal and the chrominance signal is shown in FIG. 11C. Since there is dephasing in a horizontal direction, the subsampling of luminance signal can be performed in which sample positions are matched by average treatment in a horizontal direction (Expression 10).

[Math. 10]

$$Rec'_L(m, n) = \frac{1}{2}(Rec_L(M, N) + Rec_L(M + 1, N)) \quad \text{(Expression 10)}$$

$$M = 2k, N = k(k = 0, 1, 2, \ldots)$$

The subsampling methods are not limited to the above described methods. By using filter, it is possible to perform subsampling using a wider range of luminance signal. As an example, Expression 11 shows subsampling operation expression of coded luminance signal using low-pass filter of 5 taps in a horizontal direction of the subsampling method 1.

[Math. 11]

$$Rec'_L(m, n) = \sum_{j=0}^{4} LPF(i) \cdot Rec'_L(M - i - 2, N) \quad \text{(Expression 11)}$$

$$M = 4k, N = k(k = 0, 1, 2, \ldots)$$

With this, it is possible to reduce an influence of noise included in the luminance signal and to perform chrominance prediction reliably.

Embodiment 2

FIG. 12 is a block diagram showing an image decoding apparatus according to the present embodiment. An image decoding apparatus 400 shown in FIG. 12 includes an entropy decoding unit 410, an inverse quantization and inverse transform unit 420, an adder 425, a deblocking filter 430, a memory 440, an intra prediction unit 450, a motion compensation unit 460, and an intra/inter switch 470.

A chrominance signal intra prediction unit to be described later is typically included in the intra prediction unit 450, but may be included in other constituent elements. Moreover, the chrominance signal intra prediction unit may be included in an image decoding apparatus different from the image decoding apparatus 400 shown in FIG. 12.

Figure 13:
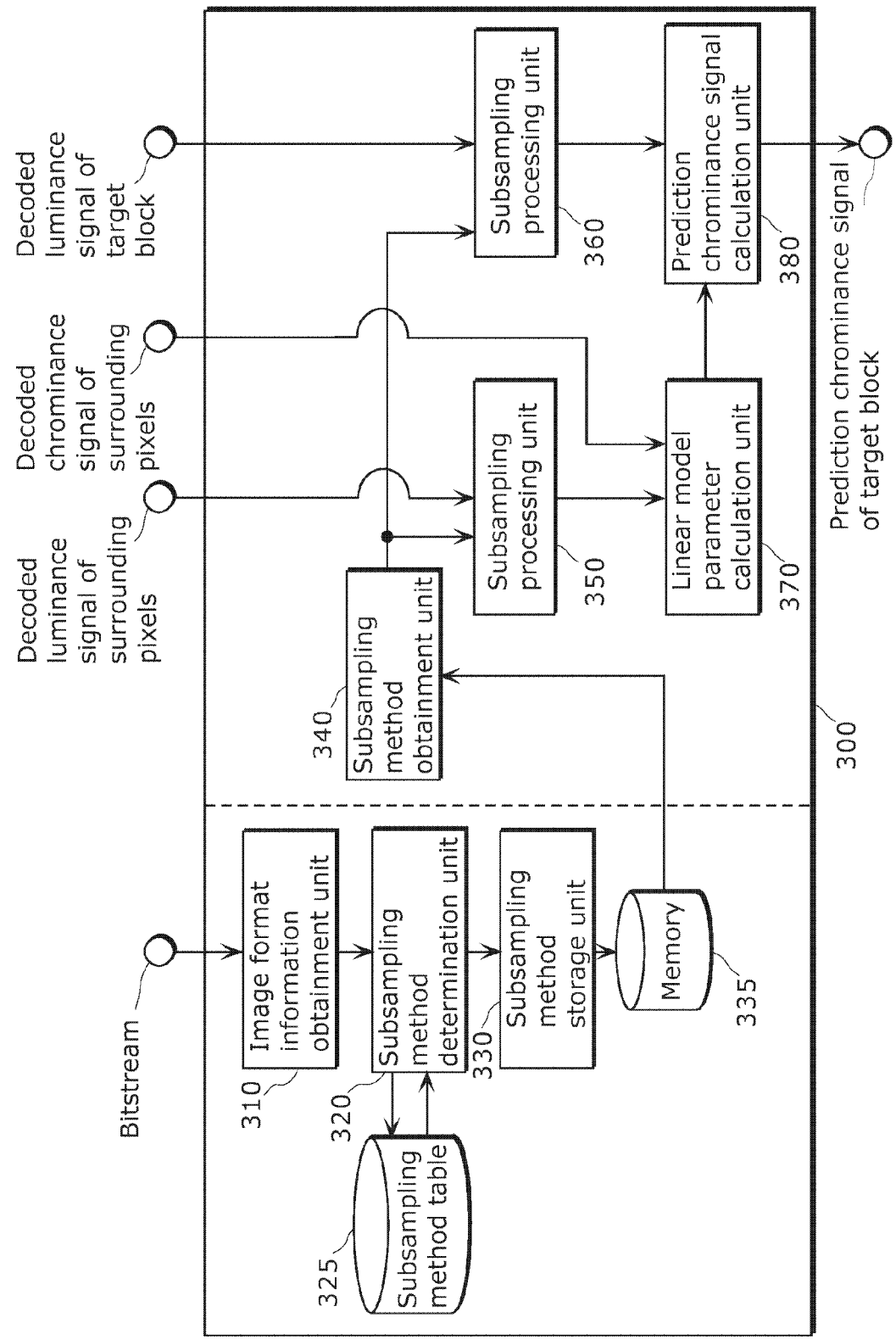
FIG. 13 is a block diagram showing an example of chrominance signal intra prediction according to Embodiment 2.

The following will describe the configuration of a chrominance signal intra prediction unit which performs an intra prediction method in the decoding of chrominance signal according to the present embodiment. FIG. 13 is a block diagram showing an example of a chrominance signal intra prediction unit according to Embodiment 2. The chrominance signal intra prediction unit 300 according to Embodiment 2 corresponds to the chrominance signal intra prediction unit 100 according to Embodiment 1. It should be noted that the chrominance signal intra prediction unit 300 according to Embodiment 2 corresponds to part of the image decoding apparatus which decodes a bitstream and outputs decoded image data.

As shown in FIG. 13, the chrominance signal intra prediction unit 300 includes an image format information obtainment unit 310, a subsampling method table 325, a subsampling method determination unit 320, a subsampling method storage unit 330, a memory 335, a subsampling method obtainment unit 340, a subsampling processing unit 350, a subsampling processing unit 360, a linear model parameter calculation unit 370, and a prediction chrominance signal calculation unit 380.

An operation of the chrominance signal intra prediction unit 300 according to Embodiment 2 will be described in detail with reference to FIG. 14.

Figure 14:
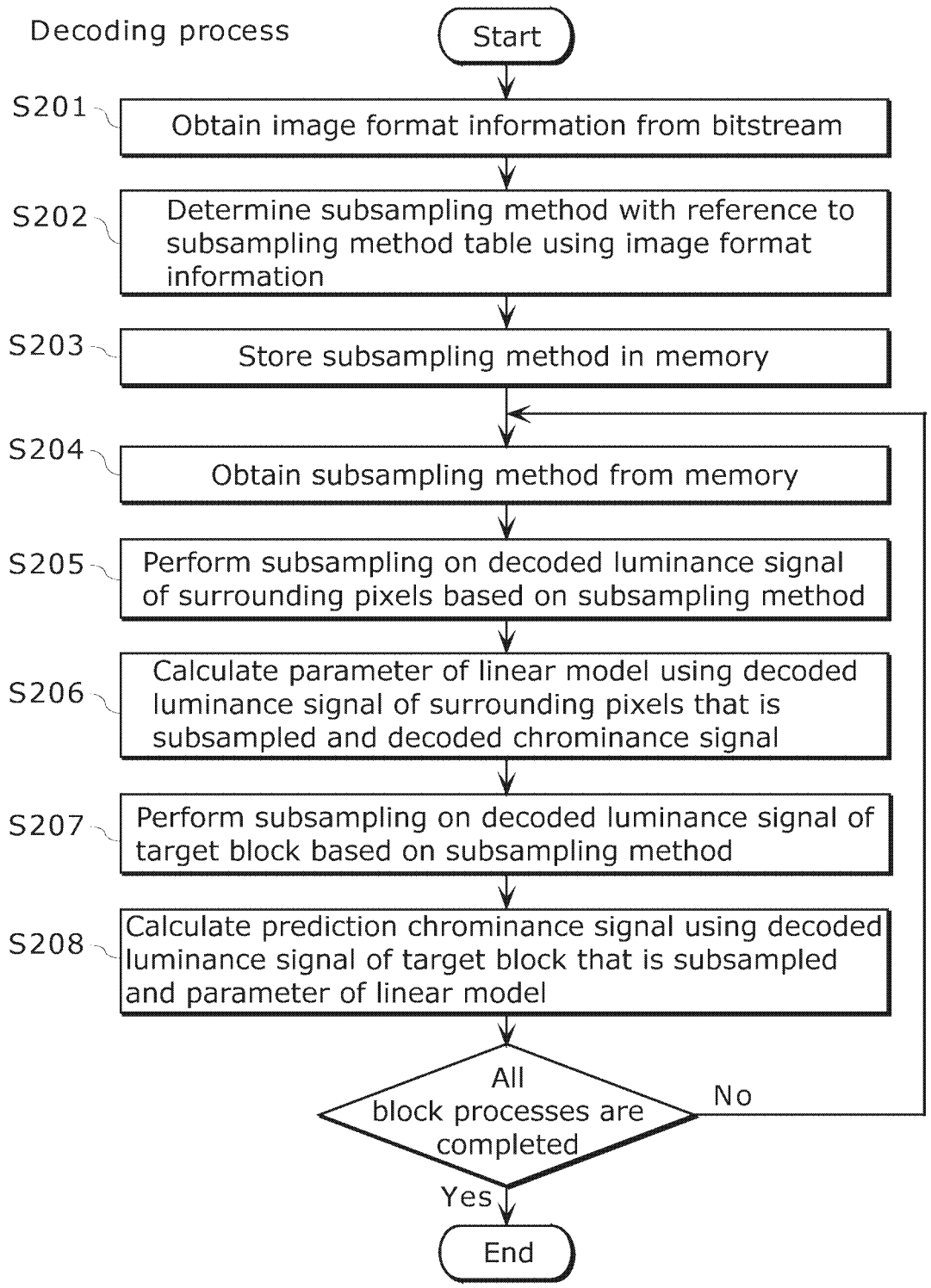
FIG. 14 is a flowchart showing an example of chrominance signal intra prediction according to Embodiment 2.

FIG. 14 is a flowchart showing a flow of processes performed by the chrominance signal intra prediction unit 300. First, image format information of a bitstream that is a decoding target is obtained (Step S201). The image format information includes chrominance format information showing the ratio of the number of samples and the sample positions for chrominance signal with respect to the number of samples and the sample positions for luminance signal, and field type information showing whether the recording method of input image belongs to a progressive method or an interlace method. The image format information is obtained by a method for reading image format information recorded in the header part of an image.

Next, by using the obtained image format information, with reference to the subsampling method table 325, a subsampling method to be applied to luminance signal is determined (Step S202). The subsampling method table 325 stores subsampling methods. The subsampling method table 325 is formed in matrix of combination of chrominance format information and field type information, and a subsampling method is allocated to each of the combinations.

Next, the determined subsampling method is stored in the memory 335 (Step S203). The once stored subsampling method is held until an input image is switched.

The following processes are iterative processes performed in all the blocks to be processed of the input image. It should be noted that the above described S201 to S203 and the following Steps S204 to S208 are not necessarily continuous. Steps S201 to S203 may be performed at previous stages instead of the beginning of chrominance signal intra prediction, and the subsampling method may be shared by a processing unit other than the chrominance signal intra prediction.

In the iterative process, first, the subsampling method stored in the memory 335 is obtained (Step S204).

Next, based on the obtained sampling method, by performing subsampling on the decoded luminance signal of surrounding pixels of the current block to be decoded, the number of samples and the sample positions for the luminance signal are matched with respect to the number of samples and the sample positions for decoded chrominance signal of surrounding pixels (Step S205).

Next, by using the decoded luminance signal and the decoded chrominance signal both on which subsampling is performed, parameters of linear model are extracted (Step S206). More specifically, the parameters are calculated by least squares of parameter values $\alpha$ and $\beta$ of linear model of Expression 1. At this time, as measured value, by using the decoding luminance signal and the decoded chrominance signal both on which subsampling is performed, $\alpha$ and $\beta$ are calculated by Expression 12 and Expression 13.

[Math. 12]

$$\alpha = \frac{\sum Rec_c(i) \cdot Rec'_L(i) - \sum Rec_c(i) \cdot \sum Rec'_L(i)}{\sum Rec'_L(i) \cdot Rec'_L(i) - (\sum Rec'_L(i))^2} \quad \text{(Expression 12)}$$

[Math. 13]

$$\beta = \sum Rec_c(i) - \alpha \cdot \sum Rec'_L(i) \quad \text{(Expression 13)}$$

Next, based on the obtained subsampling method, by performing subsampling on the decoded luminance signal of the current block to be decoded, the number of samples and the sample positions for the decoded luminance signal of the current block to be decoded are matched with respect to the number of samples and the sample positions for the chrominance signal of the current block to be decoded (Step S207).

Next, by substituting, into Expression 1, the prediction parameters $\alpha$ and $\beta$, and the decoded luminance signal of the current block to be decoded on which subsampling is performed, the prediction chrominance signal of the current block to be decoded is calculated (Step S208).

The subsampling method table and the subsampling method according to Embodiment 2 are similar to those according to Embodiment 1.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image coding apparatus according to each of the embodiments is a program described below.

In other words, the program causes a computer to perform an image coding method for predicting chrominance according to a linear model using luminance of an image, the program causing a computer to execute the image coding method including: obtaining image format information from an input image; determining a subsampling method for a luminance signal using the image format information; storing the subsampling method in a memory; obtaining the subsampling method from the memory; performing, by the subsampling method, subsampling on a coded luminance signal of a surrounding pixel of a current block to be coded; calculating a parameter of the linear model using (i) the coded luminance signal that is subsampled in the performing of subsampling on the coded luminance signal of the surrounding pixel of the current block and (ii) coded chrominance of the surrounding pixel; performing, by the subsampling method, subsampling on the coded luminance signal of the current block; and calculating prediction chrominance of the current block using (i) the parameter of the linear model and (ii) the coded luminance signal that is subsampled in the performing of subsampling on the coded luminance signal of the current block.

As described above, the image coding method according to one or more embodiments of the present invention is described based on the embodiments. However, the present invention is not defined only by the embodiments. Although only some exemplary embodiments have been described in detail above, those skilled in the art will readily appreciate that various modifications may be made in one or more exemplary embodiments of the present invention without materially departing from the principles and spirit of the inventive concept, the scope of which is defined in the appended Claims and their equivalents.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 15:
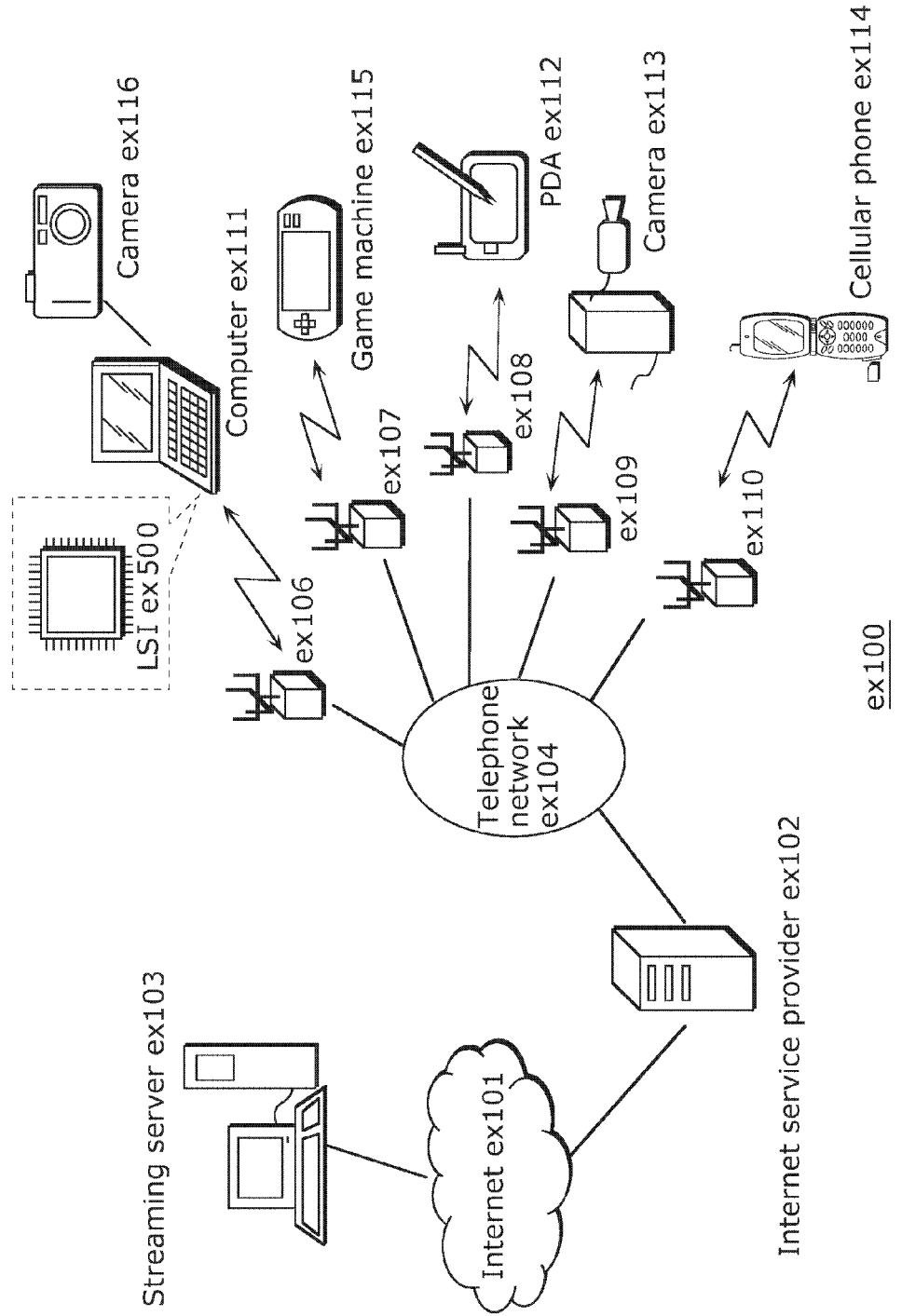
FIG. 15 is an illustration of an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
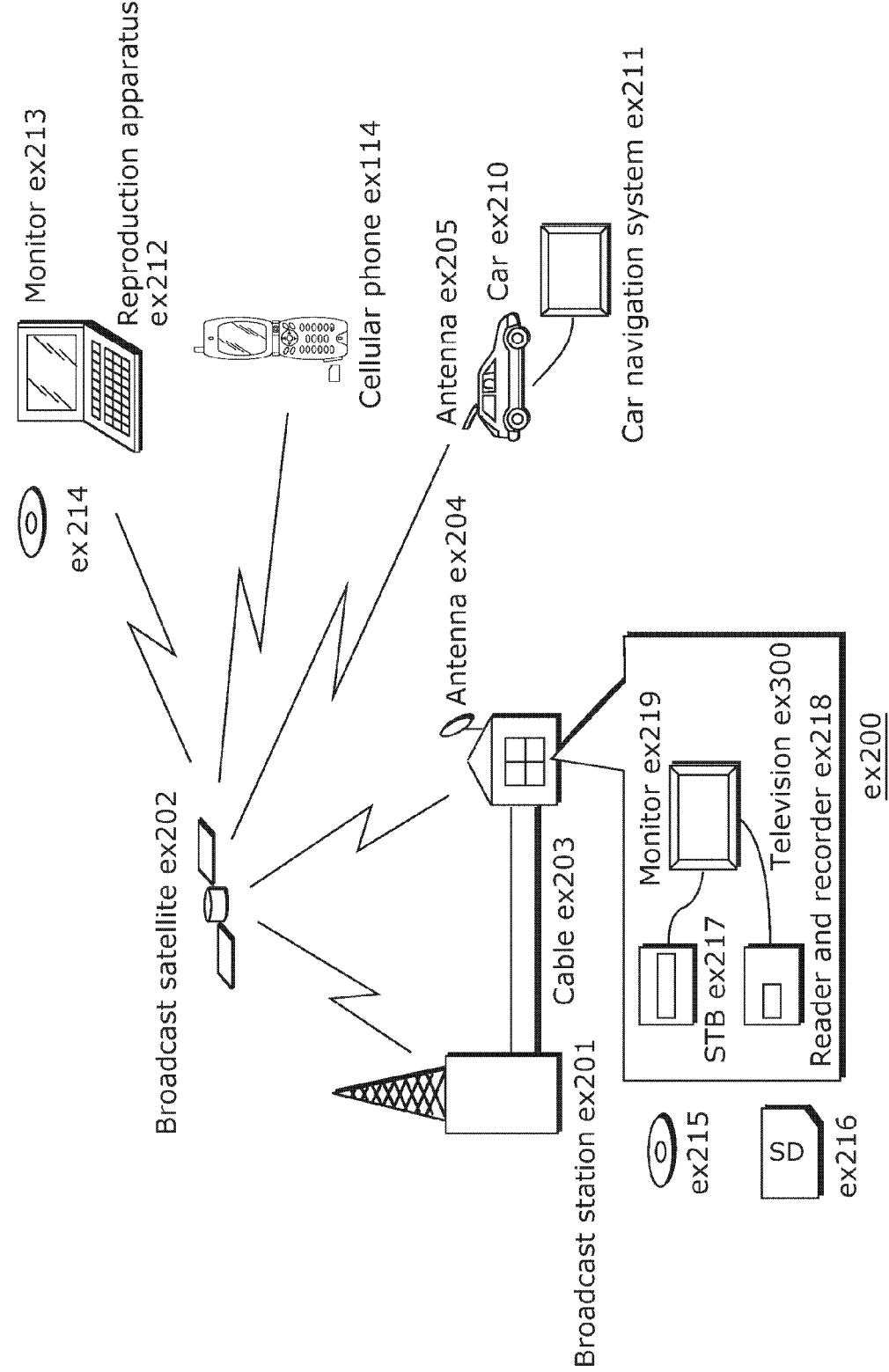
FIG. 16 is an illustration of an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300.

The moving picture decoding apparatus may be implemented not in the set top box but in the television ex300.

Figure 17:
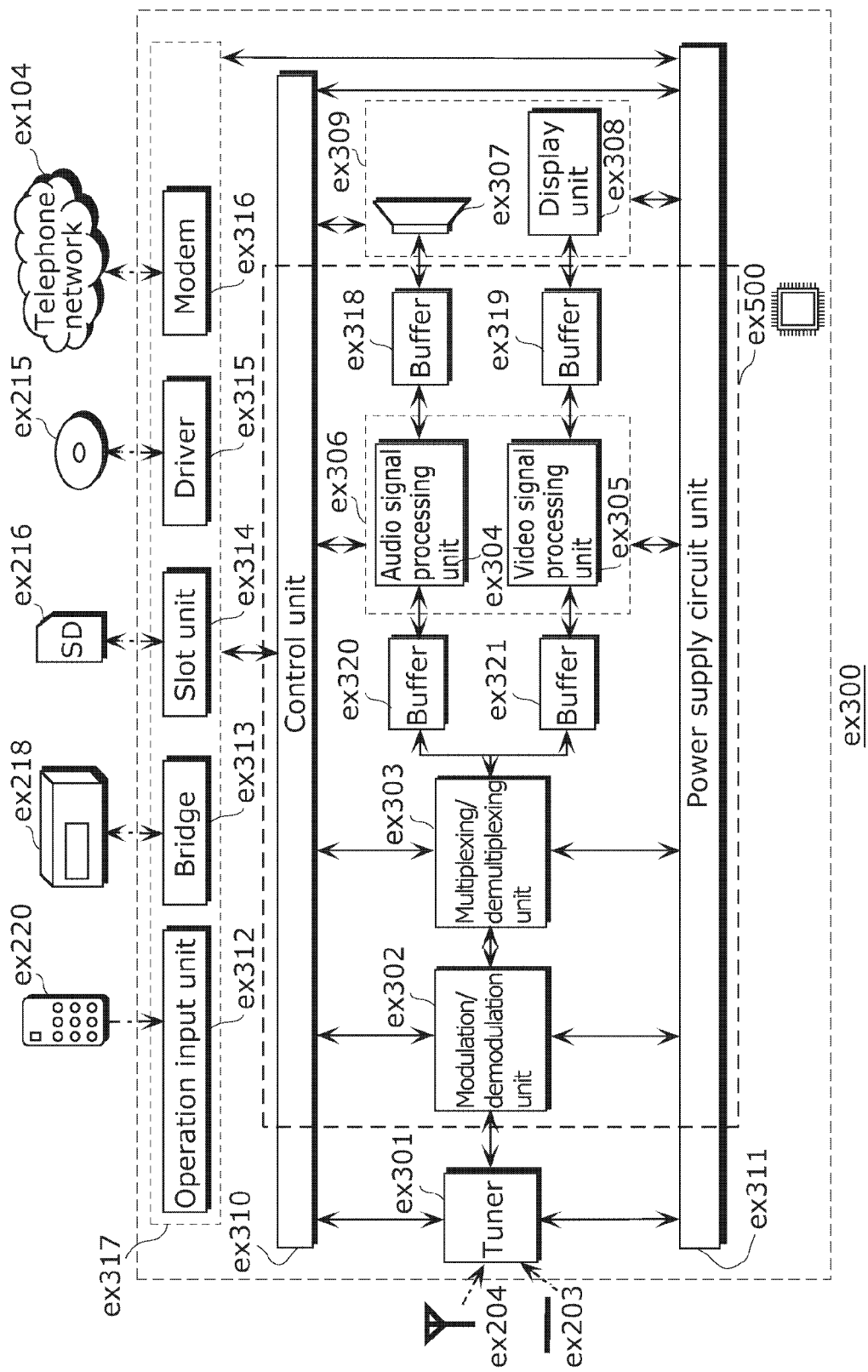
FIG. 17 is a block diagram illustrating an example of a configuration of a television.

FIG. 17 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
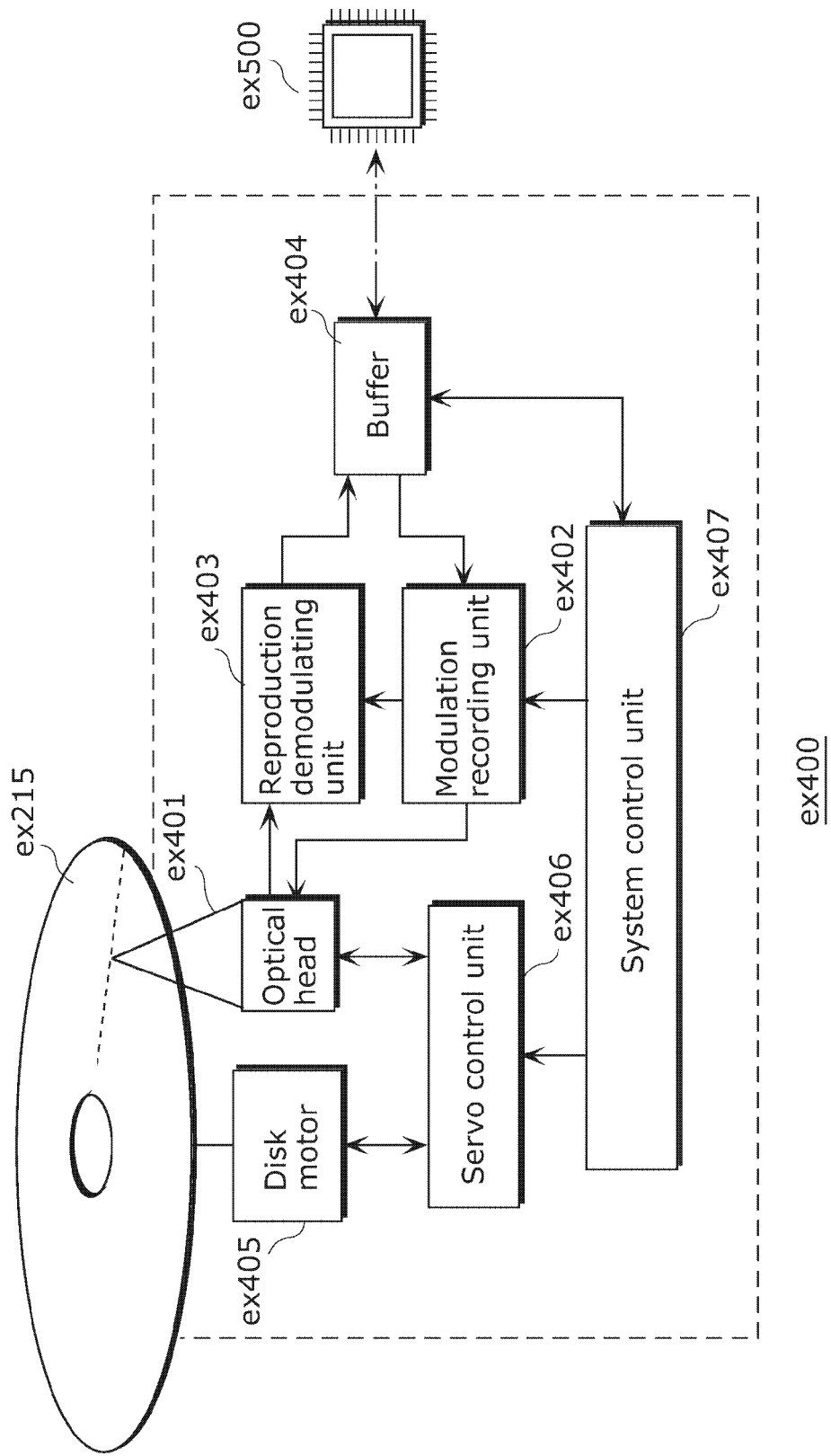
FIG. 18 is a block diagram illustrating an example of a configuration of an information reproducing/recording unit that reads and writes information from or on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
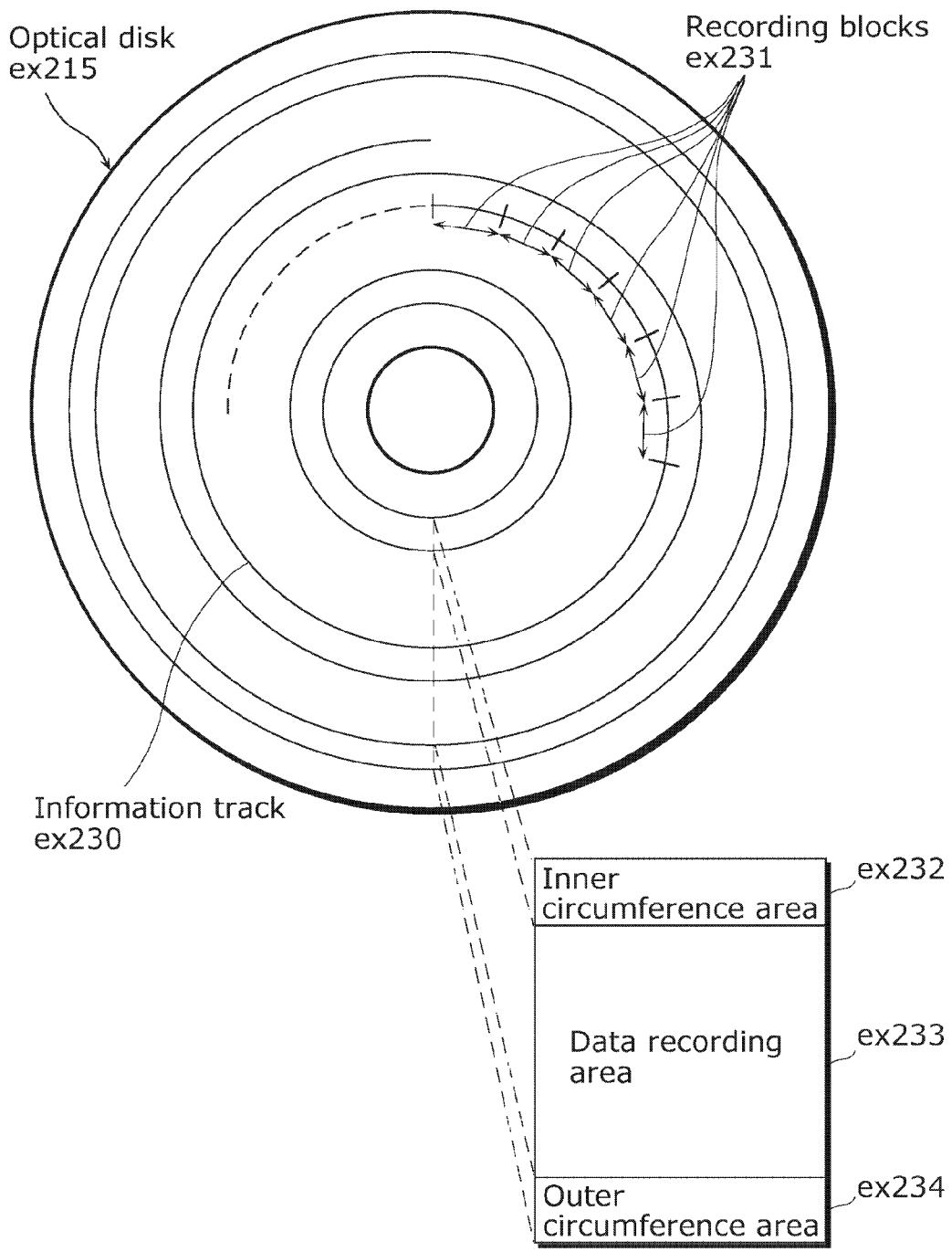
FIG. 19 is an illustration of an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
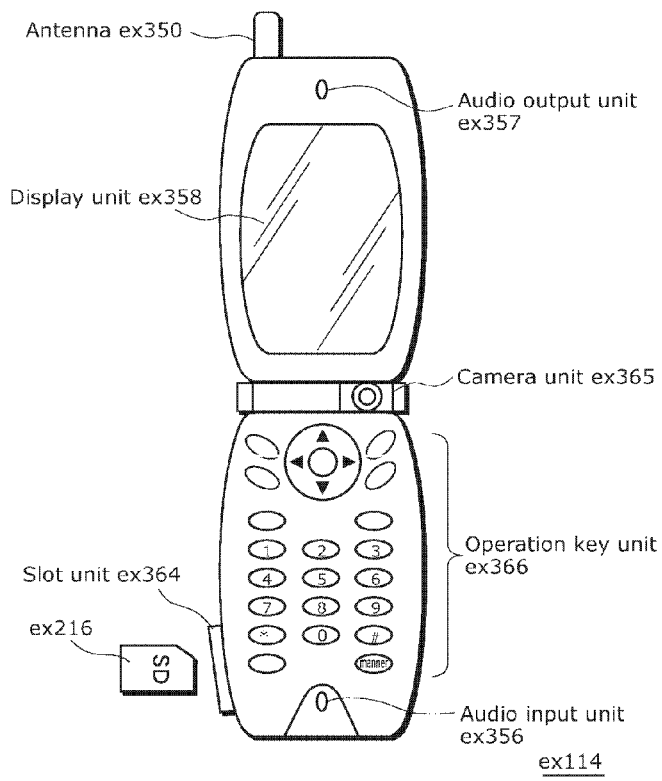
FIG. 20A is an illustration showing an example of a cellular phone.

FIG. 20A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
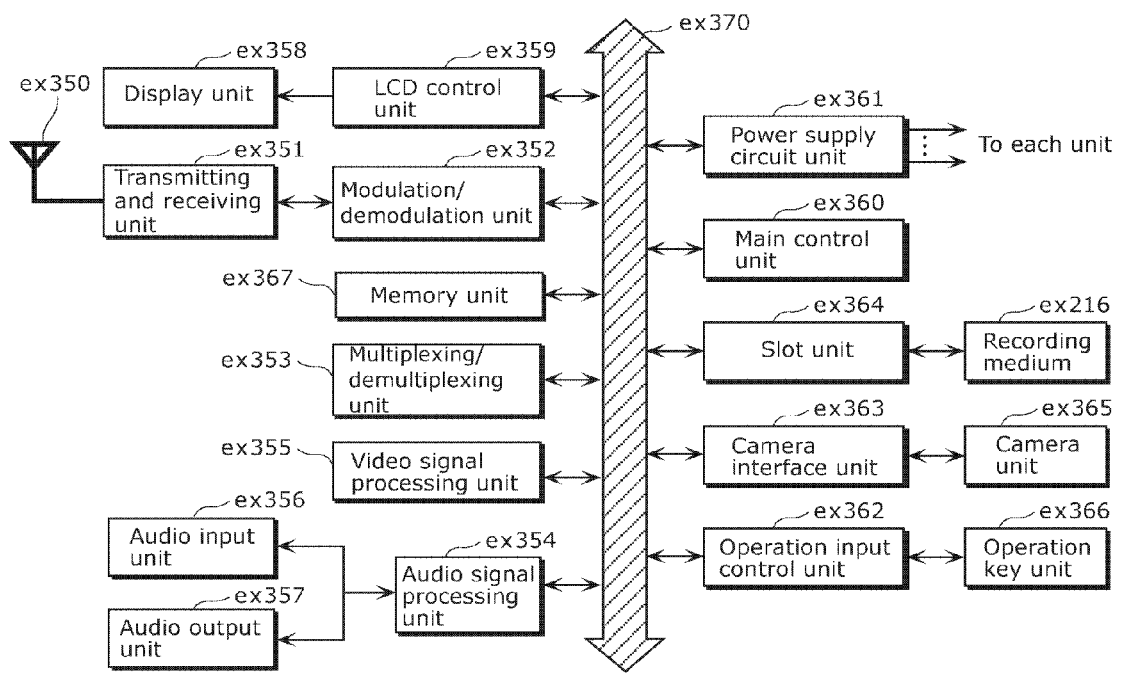
FIG. 20B is a block diagram showing an example of a configuration of the cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 22:
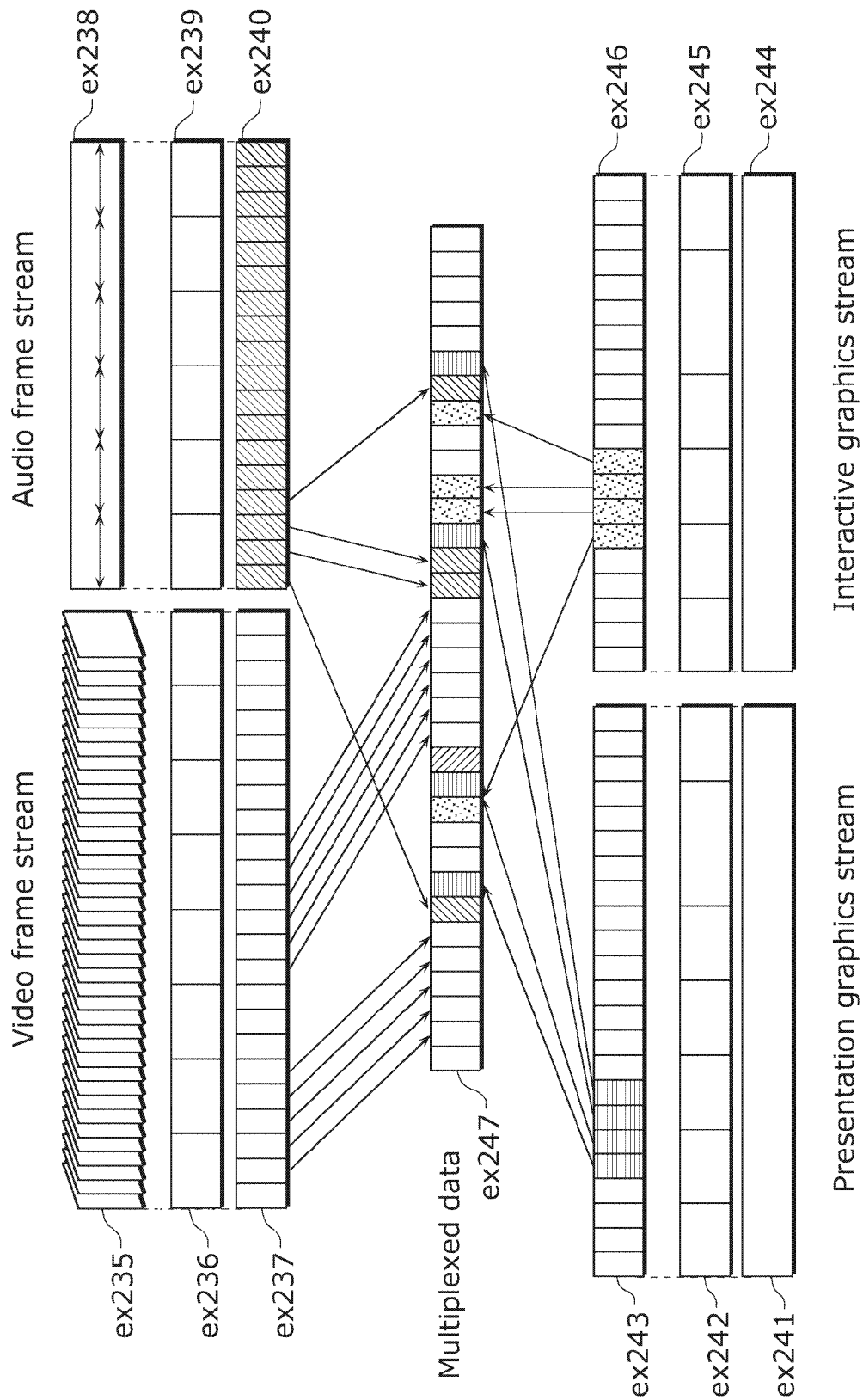
FIG. 22 is schematic illustration of how each of streams is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
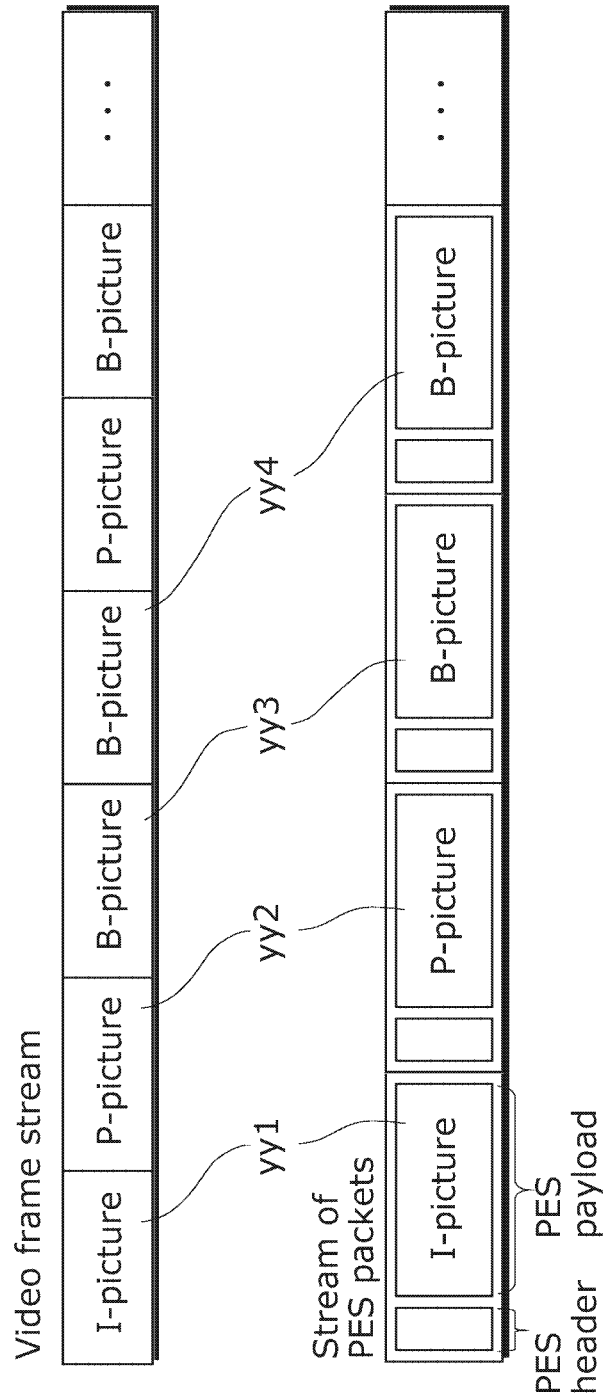
FIG. 23 is illustration of how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 24:
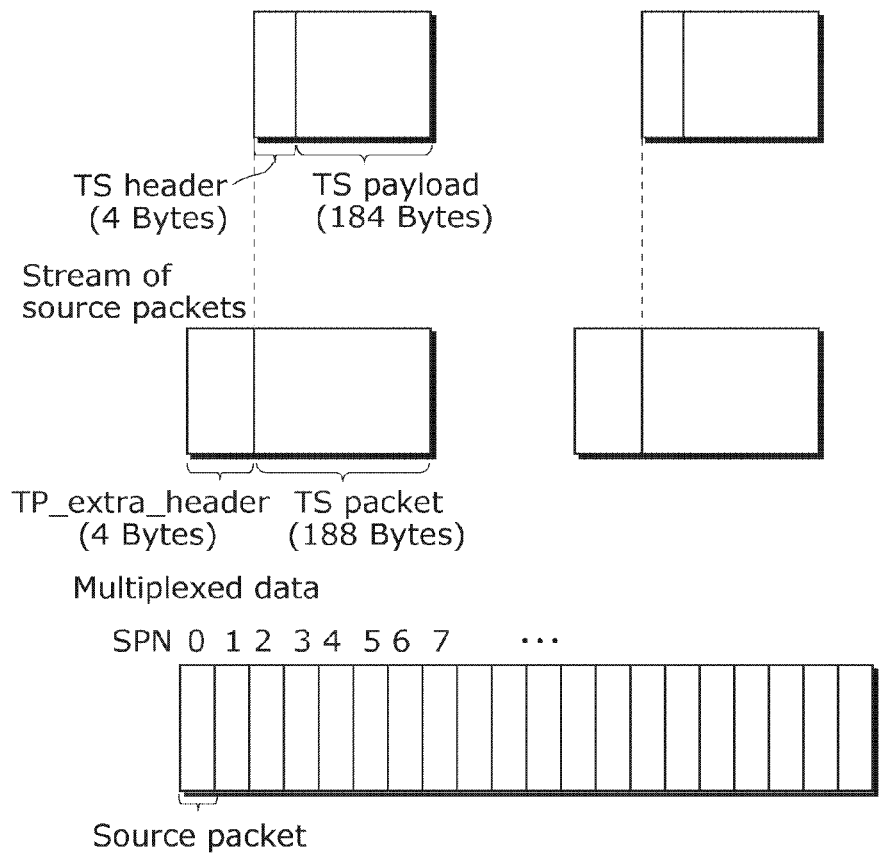
FIG. 24 is illustration showing a structure of TS packets and source packets in the multiplexed data.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
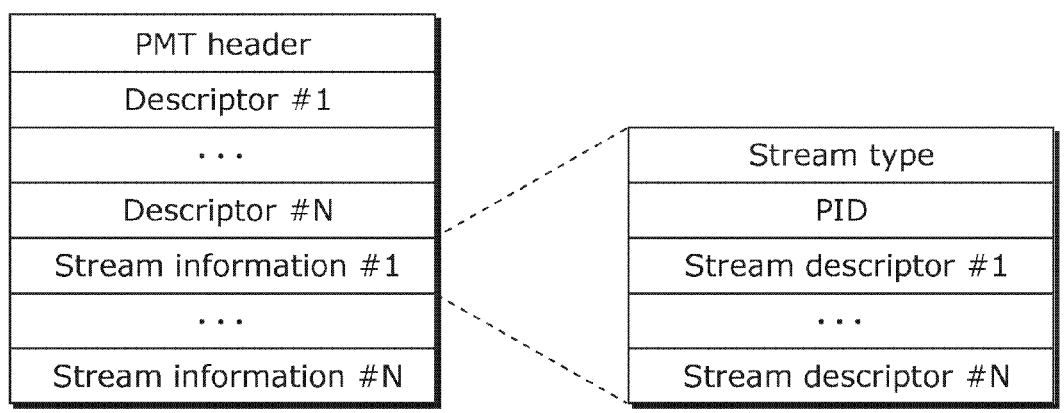
FIG. 25 is illustration showing a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 26:
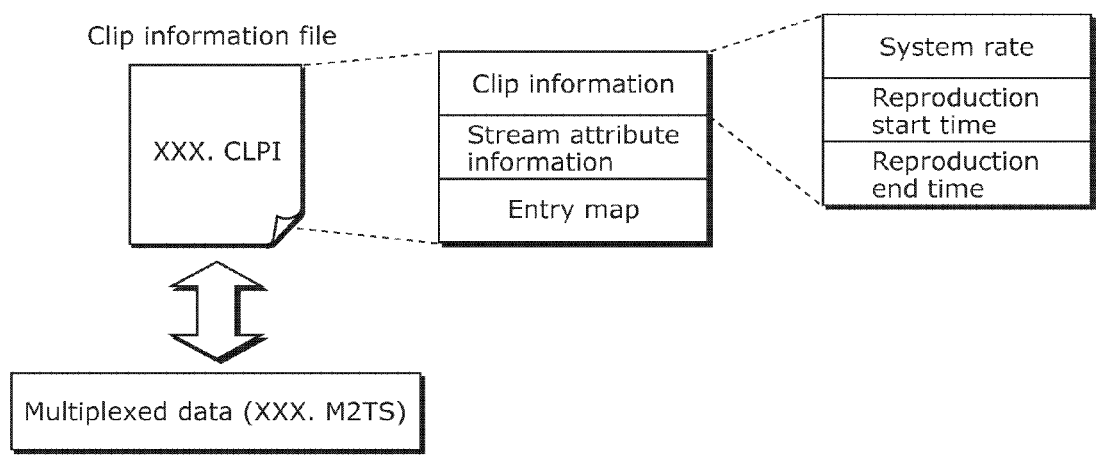
FIG. 26 is an illustration showing an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
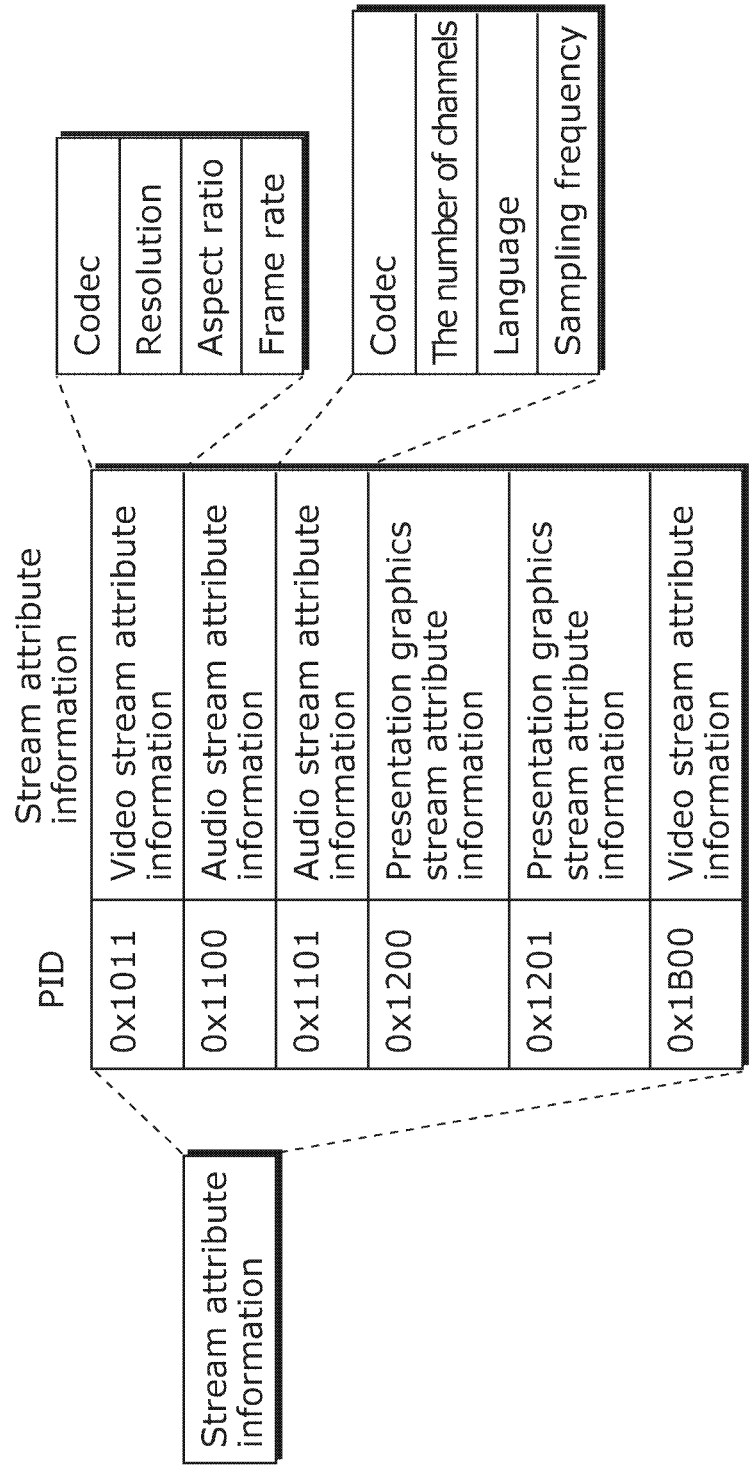
FIG. 27 is an illustration showing an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 28:
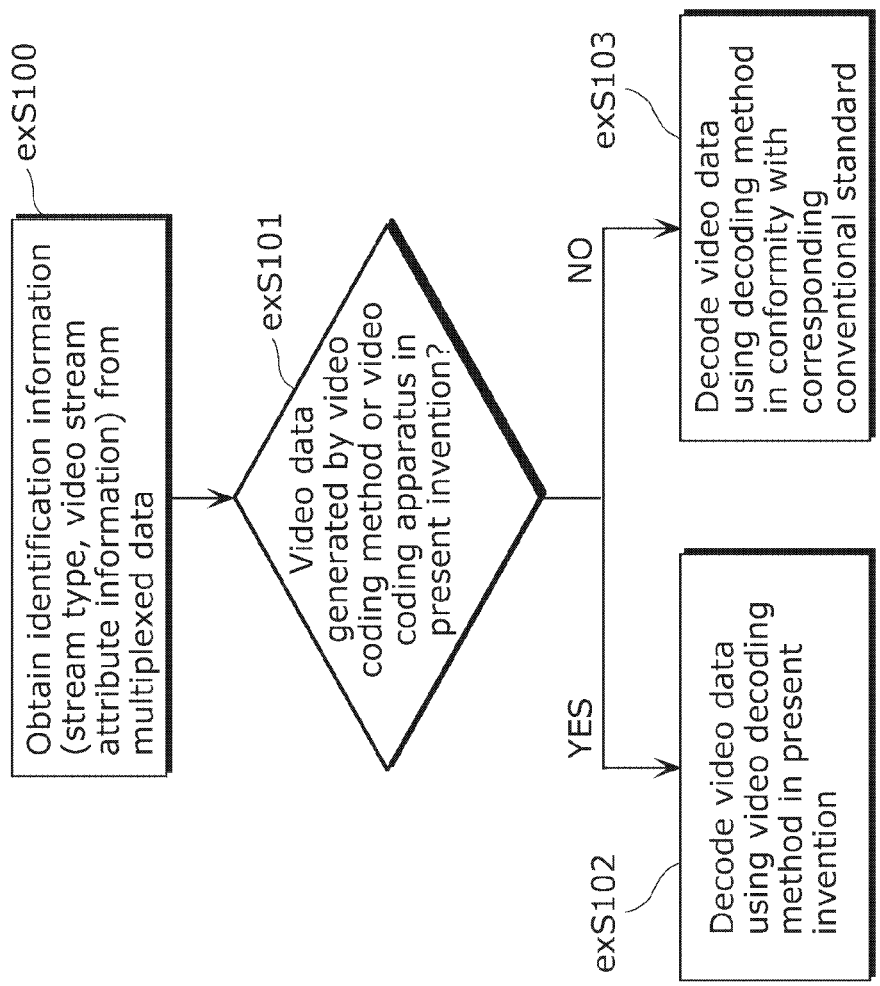
FIG. 28 is an illustration showing steps for identifying video data.

Furthermore, FIG. 28 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 29:
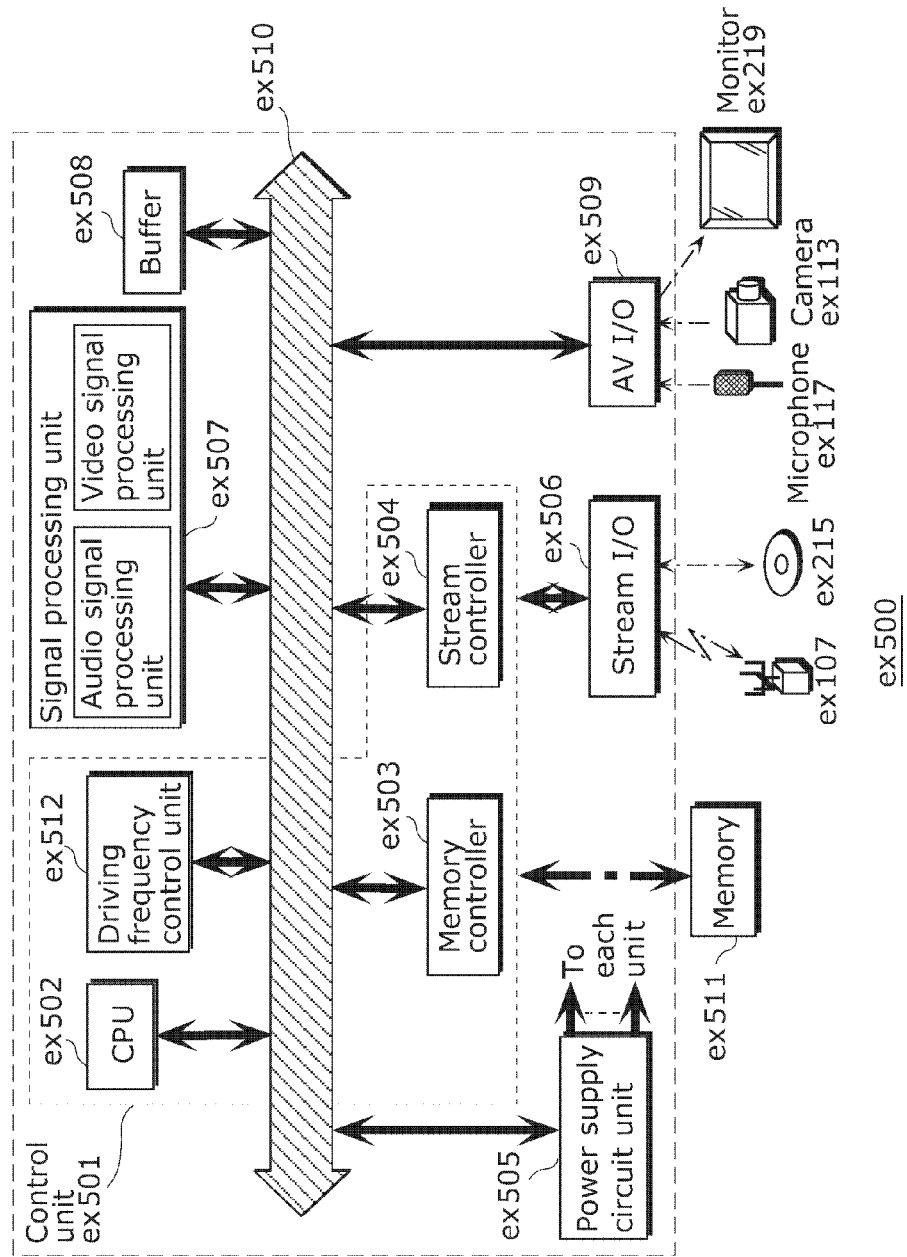
FIG. 29 is a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
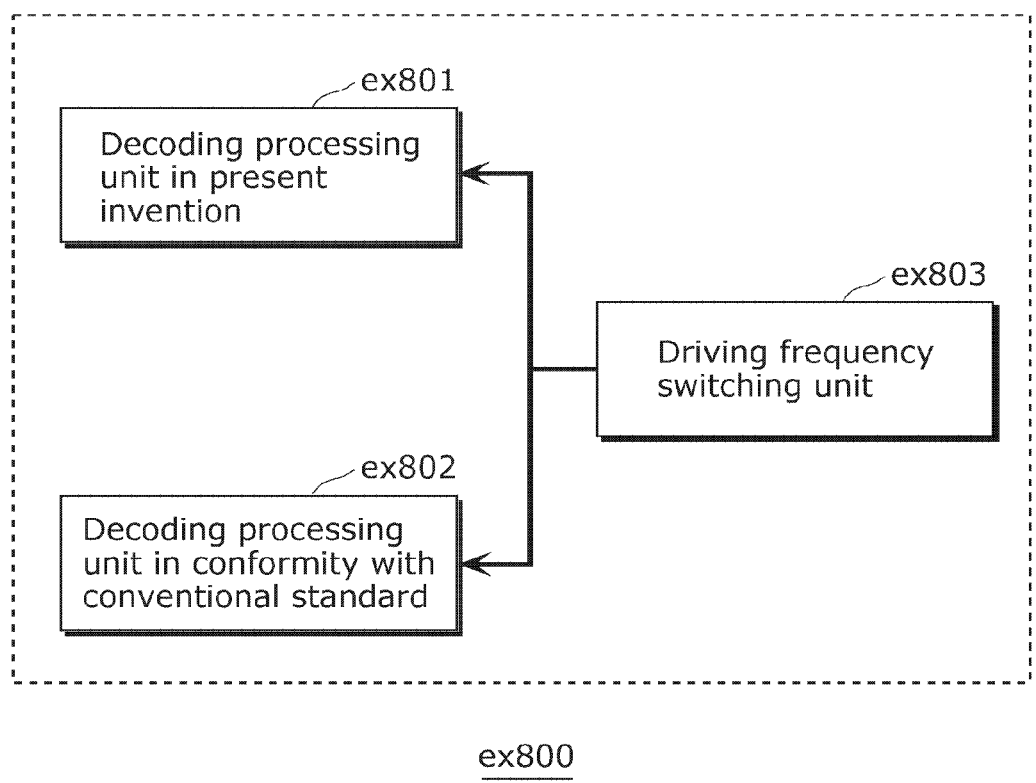
FIG. 30 is an illustration showing a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
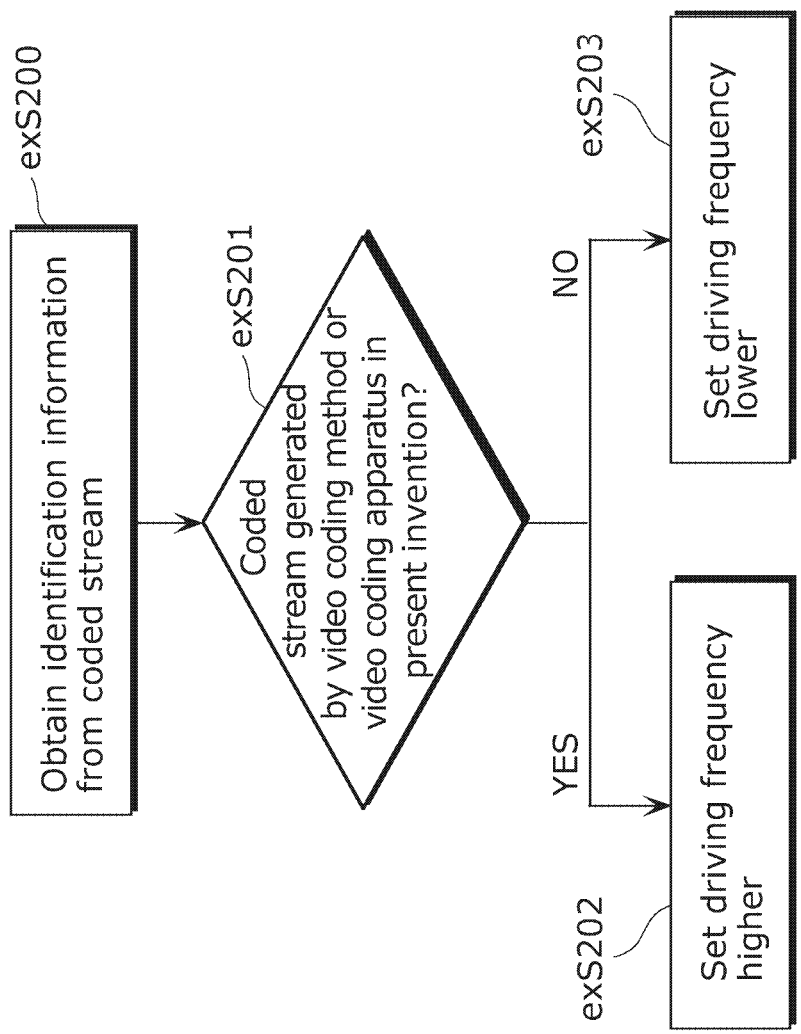
FIG. 31 is an illustration showing steps for identifying video data and switching between driving frequencies.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 33B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image coding method and the image decoding method according to the present invention can be applied to a television receiver, a digital video recorder, a car navigation system, a mobile phone, a digital camera, a digital vide camera, or the like.

REFERENCE SIGNS LIST 100, 300 Chrominance signal intra prediction unit
110, 310 Image format information obtainment unit
120, 320 Subsampling method determination unit
125, 325 Subsampling method table
130, 330 Subsampling method storage unit
135, 250, 335, 440 Memory
140, 340 Subsampling method obtainment unit
150, 160, 350, 360 Subsampling processing unit
170, 370 Linear model parameter calculation unit
180, 380 Prediction chrominance signal calculation unit
200 Image coding apparatus
205 Subtractor
210 Transform quantization unit
220 Entropy coding unit
230, 420 Inverse quantization and inverse transform unit
235, 425 Adder
240, 430 Deblocking filter
260, 450 Intra prediction unit
270 Motion estimation unit
280, 460 Motion compensation unit
290, 470 Intra/inter switch
400 Image decoding apparatus
410 Entropy decoding unit

The invention claimed is:

1. An image coding method for predicting chrominance according to a linear model, using luminance of an image, the image coding method comprising:
   obtaining image format information from an input image;
   determining a subsampling method for a luminance signal using the image format information;
   storing the subsampling method in a memory;
   obtaining the subsampling method from the memory;
   performing, by the subsampling method, subsampling on a coded luminance signal of a surrounding pixel of a current block to be coded;
   calculating a parameter of the linear model using (i) the coded luminance signal that is subsampled in the performing of subsampling on the coded luminance signal of the surrounding pixel of the current block and (ii) coded chrominance of the surrounding pixel;
   performing, by the subsampling method, subsampling on the coded luminance signal of the current block; and
   calculating prediction chrominance of the current block using (i) the parameter of the linear model and (ii) the coded luminance signal that is subsampled in the performing of subsampling on the coded luminance signal of the current block.

2. The image coding method according to claim 1, wherein, in the determining, the subsampling method is determined with reference to a subsampling method table in which the image format information and the subsampling method are associated with each other.

3. An image decoding method for predicting chrominance according to a linear model, using a bitstream, the image decoding method comprising:
   obtaining image format information from an input bitstream;
   determining a subsampling method for a luminance signal using the image format information;
   storing the subsampling method in a memory;
   obtaining the subsampling method from the memory;
   performing, by the subsampling method, subsampling on a decoded luminance signal of a surrounding pixel of a current block to be decoded;
   calculating a parameter of the linear model using (i) the decoded luminance signal that is subsampled in the performing of subsampling on the decoded luminance signal of the surrounding pixel of the current block and (ii) decoded chrominance of the surrounding pixel;
   performing, by the subsampling method, subsampling on a decoded luminance signal of the current block; and
   calculating prediction chrominance of the current block using (i) the parameter of the linear model and (ii) the decoded luminance signal that is subsampled in the performing of subsampling on the decoded luminance signal of the current block.

4. The image decoding method according to claim 3, wherein, in the determining, the subsampling method is determined with reference to a subsampling method table in which the image format information and the subsampling method are associated with each other.

* * * * *